United States Patent
Arai et al.

(10) Patent No.: US 7,433,127 B2
(45) Date of Patent: Oct. 7, 2008

(54) IMAGING DEVICE AND DISPLAY DEVICE

(75) Inventors: Jun Arai, Tokyo (JP); Masaki Kobayashi, Tokyo (JP); Tomoyuki Mishina, Tokyo (JP); Makoto Okui, Tokyo (JP); Fumio Okano, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 230 days.

(21) Appl. No.: 11/255,193

(22) Filed: Oct. 21, 2005

(65) Prior Publication Data

US 2006/0092527 A1 May 4, 2006

(30) Foreign Application Priority Data

Oct. 21, 2004 (JP) ............................ 2004-306735
Aug. 17, 2005 (JP) ............................ 2005-236996
Oct. 18, 2005 (JP) ............................ 2005-303695

(51) Int. Cl.
*G02B 27/10* (2006.01)
*G02B 17/00* (2006.01)

(52) U.S. Cl. ..................... 359/626; 359/619; 359/620; 359/728

(58) Field of Classification Search ............... 359/642, 359/726, 727, 728, 744, 619, 620, 626; 250/200, 250/216, 226; 382/100, 154
See application file for complete search history.

(56) References Cited

U.S. PATENT DOCUMENTS 5,650,876 A * 7/1997 Davies et al. ............... 359/622
5,986,744 A * 11/1999 Kudo et al. .................. 355/55
6,072,627 A * 6/2000 Nomura et al. ............. 359/463
7,054,067 B2 * 5/2006 Okano et al. ............... 359/622
2002/0054434 A1 * 5/2002 Florczak et al. ............ 359/619
2003/0112523 A1 * 6/2003 Daniell ...................... 359/626

FOREIGN PATENT DOCUMENTS

| JP | 8-289329 | 11/1996 |
| JP | 10-150675 | 6/1998 |
| JP | 2005-140970 | 6/2005 |

OTHER PUBLICATIONS

T. Okoshi, "Three-dimensional Imaging Techniques", Academic, New York, 1971, pp. 79-82. (Japanese).
Iga et al., "Distributed-index planar microlens", Applied Optics, vol. 21, No. 6, Mar. 15, 1982, pp. 1052-1056.

* cited by examiner

*Primary Examiner*—Ricky Mack
*Assistant Examiner*—Mahidere S Sahle
(74) *Attorney, Agent, or Firm*—Kratz, Quintos & Hanson, LLP

(57) ABSTRACT

Disclosed are an imaging device and a display device which both have a simple structure without any need of an image conversion. The imaging device includes a lens component group including multiple lens component systems, each of which focuses incident light from the object, thereby creating a non-inverted image of the object, the lens component systems being arranged in an array form and on the same level, and an image capturing mechanism for picking up the created image. In addition, each of the lens component systems includes an afocal optical system and an image-forming system. The afocal optical system includes at least one optical element for inverting an externally incident light ray relative to its optical axis and outputting the light ray. The optical element has uniform refractive index. The image-forming system includes at least one optical element having uniform refractive index throughout its interior.

20 Claims, 17 Drawing Sheets

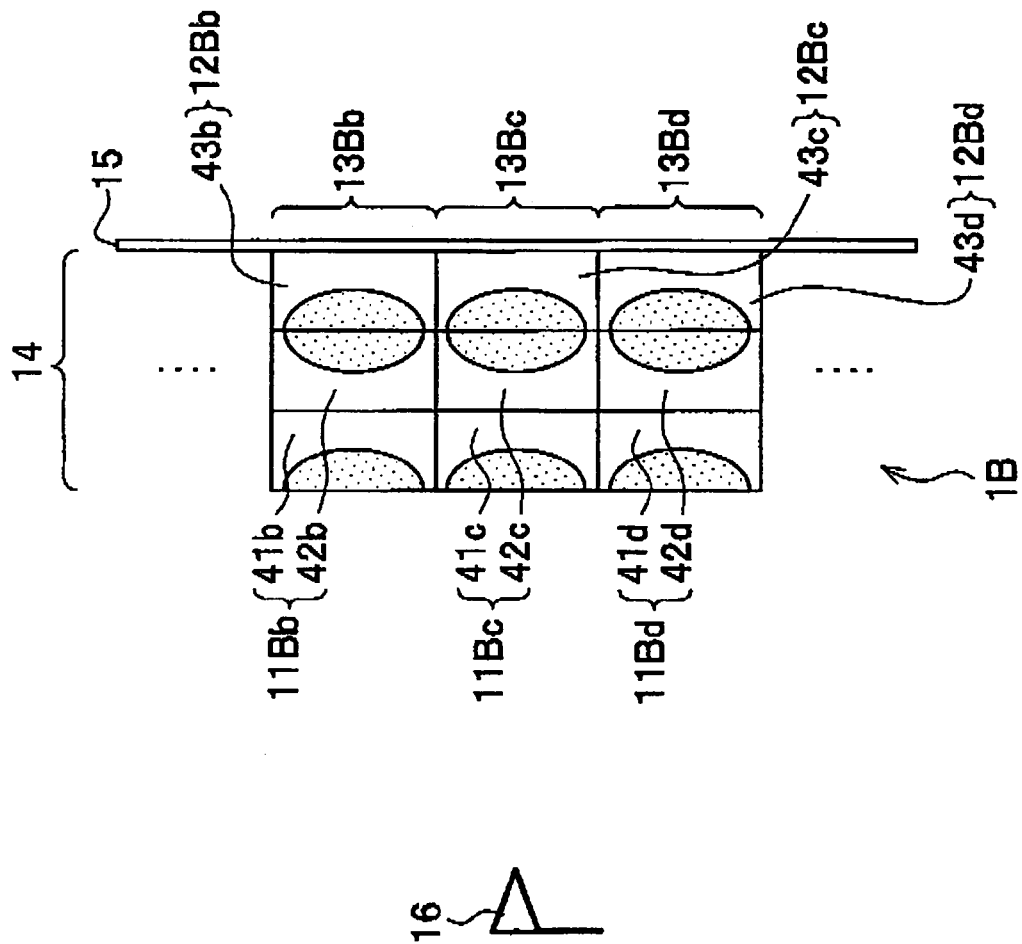

IMAGING DEVICE AND DISPLAY DEVICE

CROSS-REFERENCE TO RELATED APPLICATIONS

This application claims the benefit of Japanese Patent Applications 2004-306735 filed on Oct. 21, 2004, 2005-236996 filed on Aug. 17, 2005, and 2005-303695 filed on Oct. 18, 2005, the disclosures of which are incorporated herein by reference.

BACKGROUND OF THE INVENTION

1. Field of the Invention

The present invention relates to a technique for capturing images of one or more objects to be displayed in three dimensions, and a technique for displaying the objects of the captured images in three dimensions. More specifically, the present invention is directed to an imaging device and a display device which both use a lens array composed of multiple focusing members arranged on the same level.

2. Description of the Related Art

To produce three-dimensional (3D) images at a specific view point, the known integral photography (IP) technique is being employed (see Japanese Unexamined Patent Application Publication 8-289329). In this IP technique, one or more objects are focused by multiple lenses (lens array) or pin holes arranged on the same level, and the image of the focused objects is then captured. Following this, the captured image is displayed. Finally, a person (viewer) can see the displayed image at a specific position through the lens array. In this way, it is possible for 3D images to be presented.

A detailed description will be given below, of the IP technique using a convex lens array composed of multiple convex lenses, with reference to FIGS. 20A to 23B. FIGS. 19A and 19B show a general mode in which objects are captured according to the conventional IP technique. More specifically, FIG. 20A shows a conventional imaging device according to the IP technique, and FIG. 20B shows a schematic image captured by the imaging device. FIG. 21 shows the characteristics of the lateral optical magnification of images focused by the convex lenses of the imaging device. FIG. 22 shows a schematic conversion manner of an image captured with the IP technique. FIGS. 23A and 23B show a mode in which an image of objects is displayed in three dimensions with the IP technique. More specifically, FIG. 23A shows the schematic configuration of a display device according to the IP technique and a mode in which an image of objects is displayed in three dimensions by the display device. Furthermore, FIG. 23B shows the image presented on a display of the display device.

Firstly, referring to FIG. 20A, an imaging device 110 according to the IP technique will be described. In this figure, objects are two point light sources 115a and 115b, and convex lenses constituting a convex lens array 112 are three convex lenses 111b, 111c and 111d. In addition, these lenses are all arranged adjacent to one another.

The imaging device 110 includes the convex lens array 112 and a camera 113. Furthermore, the convex lens array 112 is composed of multiple convex lenses 111b, 111c and 111d arranged on the same level. This lens array 112 focuses light from objects (point light sources 115a and 115b) on the camera 113. The camera 113 captures images of the objects. To be concrete, the point light sources 115a and 115b emit light in various directions. Part of the light passes through the convex lens 111b, 111c and 111d, and this light then enters an objective lens 114. This objective lens 114 converges the entered light on an imaging element (not shown) of the camera 113, so that an image of the point light sources 115a and 115b appears thereon. Finally, the image of the point light sources 115a and 115b is captured by the camera 113. In this function, it should be noted that the captured image is inverted in orientation.

The characteristics of lateral optical magnification "m" of the object focused by each convex lens are revealed in FIG. 21. In this figure, "L11" stands for a distance between the object and each convex lens, and "f" stands for the focal length of each convex lens. As is clearly found from this figure, if "L11" is less than "–f", then "m" is of a negative value, whereby the captured object is inverted. Otherwise, if "L11" is more than "–f", then "m" is of a positive value so that the captured object is positionally correct, that is, non-inverted. Accordingly, when the image of the point light sources 115a and 115b which is away from each convex lens by more than its focal length is captured, the captured image ends up being inverted.

As shown in FIG. 20B, an image 121 captured by the camera 113 is inverted. Naturally, the image appearing on each convex lens is also inverted.

Therefore, the image 121 needs to undergo a computing process in order to convert the inverted objects, which have been captured by the imaging device 110, into non-inverted objects, that is, positionally correct objects.

Next, with reference to FIG. 22, a description will be given below, of a method for converting the inverted image 121 of FIG. 20A into a non-inverted image. This figure shows individual images of the convex lenses 111b, 111c and 111d.

As shown in FIG. 22, the image 121 having been captured by the imaging device 110 is first divided into three images 122b, 122c and 122d. These three images correspond to the individual convex lens 111b, 111c and 111d. Following this, each of the images 122b, 122c and 122d is rotated by 180 degrees, and the rotated images 123b, 123c and 123d are then combined into a single image 124. Thus, the non-inverted image (IP image) is created.

Secondly, subsequent to the imaging device, a display device 130 according to the IP technique will be described with reference to FIGS. 23A and 23B. The display device 130 includes a display 131 and a convex lens array 133. The display 131 has a function of presenting an image 124 (IF image) thereon. The convex lens array 133 is composed of convex lenses 132b, 132c, 132d, etc. arrange on the same level, facing the display 131. Light emitted from objects 134a and 134b passes through the display 131, and then, through the convex lenses 132b, 132c and 132d. In this case, when a person (viewer) sees an image on the display 131 through the convex lens 132, the objects 134a and 134b of the image which the person sees are non-inverted. These objects 134a and 134b have the same orientation as that of the point light sources 115a and 115b of FIG. 20A. This makes it possible to display the 3D image of non-inverted, that is, positionally correct objects without the use of any special glasses or any other similar tools.

In addition to the above imaging device, another imaging device has been proposed, using an inverting optical system instead of the computing process (see Three-dimensional Imaging Techniques, T. Okoshi, Academic, New York, 1971). In this imaging device, one or more objects that have been inverted by a convex lens array are re-inverted by the inverting optical system. Consequently, the IP image of non-inverted objects can be acquired. This inverting optical system is constituted by multiple prisms and a large-diameter lens.

Moreover, an additional imaging device has been proposed, using a graded-index lens such as an optical fiber instead of the convex lenses of FIG. 20A (see Japanese Unexamined Patent Application Publication 10-150675). This imaging device enables the non-inverted IP images to be captured without performing the computing process, because the focused images are not inverted.

However, each of the above imaging devices may suffer from the following disadvantages.

The imaging device described in JP8-289329 requires the installation of a large-scale electric circuit for performing the computing process.

The imaging device described in "Three-dimensional Imaging Techniques" needs many optical components such as prisms. In addition, the imaging device described in JP10-150675 is required to have graded-index lenses. These optical components are more difficult to arrange on the same level than typical convex or concave lenses.

Taking the above disadvantages into account, the present invention has been conceived. An object of the present invention is to provide a simple imaging device and display device without any need of an image conversion. Therefore, an additional object of the present invention is to provide imaging and display devices capable of being both manufactured at low costs.

SUMMARY OF THE INVENTION

According to a first aspect of the present invention, there is provided, an imaging device for picking up an image of at least one object, including:

(a1) a lens component group including a plurality of lens component systems, each of which focuses incident light from the object, thereby creating a non-inverted image of the object, the lens component systems being arranged in an array form and in one plane perpendicular to their optical axes; and (b1) an image capturing mechanism for picking up the image created by the lens component systems;

each of the lens component systems including an afocal optical system for allowing the light from the object to pass through, and an image-forming system for focusing the light from the afocal optical system;

the afocal optical system including at least one optical element for inverting an externally incident light ray with respect to its optical axis and outputting the inverted light ray, the optical element having uniform refractive index throughout its interior;

the image-forming system including at least one optical element having uniform refractive index throughout its interior.

According to a second aspect of the present invention, there is provided, an imaging device for picking up an image of at least one object, including:

(a2) a lens component group including a plurality of lens component systems, each of which focuses incident light from the object, thereby creating a non-inverted image of the object, the lens component systems being arranged in an array form and in one plane perpendicular to their optical axes; and (b2) an image capturing mechanism for picking up the image created by the lens component systems;

each of the lens component systems including an image-forming system for focusing an externally incident light ray, and an afocal optical system for inverting the light ray from the image-forming system with respect to its optical axis and outputting the inverted light ray;

each of the image-forming system and the afocal optical system including at least one optical element having uniform refractive index throughout its interior.

According to a third aspect of the present invention, there is provided, an imaging device for picking up an image of at least one object, including:

(a3) a lens component group including a plurality of lens component systems, each of which focuses incident light from the object, thereby creating a non-inverted image of the object, the lens component systems being arranged in an array form and in one plane perpendicular to their optical axes; and (b3) an image capturing mechanism for picking up the image created by the lens component systems;

each of the lens component systems including an afocal optical system for allowing the light from the object to pass through, and an image-forming system for focusing the light from the afocal optical system;

the afocal optical system for inverting an externally incident light ray with respect to its optical axis and outputting the inverted light ray;

each of the afocal optical system and the image-forming system includes at least one optical element in which refractive index is changed in its radial and optical axis directions.

According to a fourth aspect of the present invention, there is provided, an imaging device for picking up an image of at least one object, including:

(a4) a lens component group including a plurality of lens component systems, each of which focuses incident light from the object, thereby creating a non-inverted image of the object, the lens component systems being arranged in an array form and in one plane perpendicular to their optical axes; and (b4) an image capturing mechanism for picking up the image created by the lens component systems;

each of the lens component systems including an image-forming system for focusing an externally incident light ray, and an afocal optical system for inverting the light ray from the image-forming system with respect to its optical axis and outputting the inverted light ray;

each of the afocal optical system and the image-forming system includes at least one optical element in which refractive index is changed in its radial and optical axis directions.

In conclusion, with the above-described display devices, it is possible to pick up IP images of at least one positionally correct object, and to present 3D images according to the IP technique.

According to a fifth aspect of the present invention, there is provided, a display device to which an inverted image of at least one object is inputted, the image having been created by focusing light from the object using a plurality of focusing mechanism being arranged in an array form and on the same level and been then captured, the display device for presenting the inputted image in three dimensions, including:

(a5) an image display mechanism on which the inverted image appears; and (b5) a lens component group including a plurality of lens component systems, each of which receives light reflecting the inverted image, the lens component systems being arranged in an array form and in one plane perpendicular to their optical axes;

each of the lens component systems including an afocal optical system for allowing the light to pass through, and an image-forming system for focusing the light from the afocal optical system;

the afocal optical system including at least one optical element for inverting an externally incident light ray with respect to its optical axis and outputting the inverted light ray, the optical element having uniform refractive index throughout its interior;

the image-forming system including at least one optical element having uniform refractive index throughout its interior.

According to a sixth aspect of the present invention, there is provided, a display device to which an inverted image of at least one object is inputted, the image having been created by focusing light form the object using a plurality of focusing mechanism being arranged in an array form and on the same level and been then captured, the display device for presenting the inputted image in three dimensions, including:

(a6) an image display mechanism on which the inverted image appears; and (b6) a lens component group including a plurality of lens component systems, each of which receives light reflecting the inverted image, the lens component systems being arranged in an array form and in one plane perpendicular to their optical axes;

each of the lens component systems including an image-forming system for focusing an externally incident light ray, and an afocal optical system for inverting the light ray from the image-forming system with respect to its optical axis and outputting the inverted light ray;

each of the image-forming system and the afocal optical system including at least one optical element having uniform refractive index throughout its interior.

According to a seventh aspect of the present invention, there is provided, a display device to which an inverted image of at least one object is inputted, the image having been created by focusing light form the object using a plurality of focusing mechanism being arranged in an array form and on the same level and been then captured, the display device for presenting the inputted image in three dimensions, including:

(a7) an image display mechanism on which the inverted image appears; and (b7) a lens component group including a plurality of lens component systems, each of which receives light reflecting the inverted image, the lens component systems being arranged in an array form and in one plane perpendicular to their optical axes;

each of the lens component systems including an afocal optical system for allowing the light to pass through, and an image-forming system for focusing the light from the afocal optical system;

the focal optical system for inverting an externally incident light ray with respect to its optical axis, and out-putting the inverted light ray;

each of the afocal optical system and the image-forming system including at least one optical element in which refractive index is changed in its radial and optical axis directions.

According to an eighth aspect of the present invention, there is provided, a display device to which an inverted image of at least one object is inputted, the image having been created by focusing light from the object using a plurality of focusing mechanism being arranged in an array form and on the same level and been then captured, the display device for presenting the inputted image in three dimensions, including:

(a8) an image display mechanism on which the inverted image appears; and (b8) a lens component group including a plurality of lens component systems, each of which receives light reflecting the inverted image, the lens component systems being arranged in an array form and in one plane perpendicular to their optical axes;

each of the lens component systems including an image-forming system for focusing an externally incident light ray, and an afocal optical system for inverting the light ray from the image-forming system with respect to its optical axis and outputting the inverted light ray;

each of the afocal optical system and the image-forming system including at least one optical element in which refractive index is changed in its radial and optical axis directions.

In conclusion, with the described-above display device, it is possible to present 3D images where at least one positionally correct object is shown.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein:

FIG. 14 is a schematic view depicting a configuration of the imaging device including the afocal optical systems and the image-forming optical systems, each of which is formed of an optical element in which refractive index is changed in its radial and optical axis directions;

DETAILED DESCRIPTION OF THE EXEMPLARY EMBODIMENTS OF THE INVENTION

Figure 1:
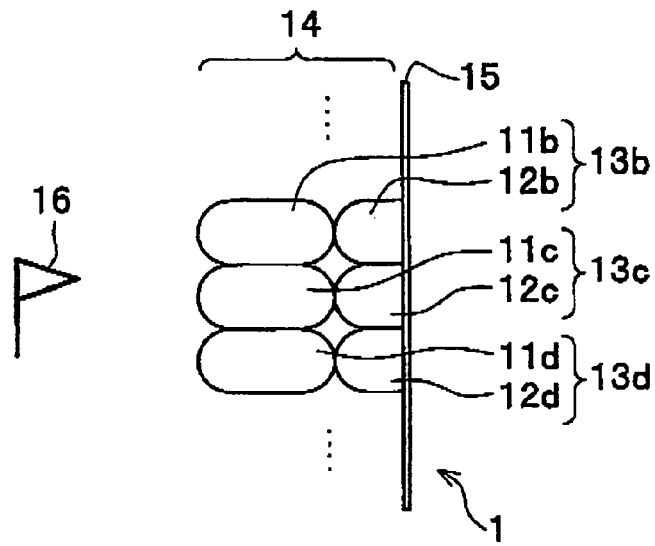
FIG. 1 is a schematic view depicting a configuration of an imaging device according to a first embodiment of the present invention.

A description will be given below, of embodiments of the present invention, with reference to attached drawings.

First Embodiment

[Configuration of Imaging Device]

A description will be given below, of a configuration of an imaging device 1 according to a first embodiment of the present invention, with reference to FIG. 1. This imaging device 1 has a function of capturing the IP images of an object 16, and it includes a lens component group 14 and a photographic film 15.

The lens component group 14 is an array of multiple lens component systems 13b, 13c, 13d, etc. arranged in one plane perpendicular to an optical axis. These lens component systems 13b, 13c, 13d, etc. each have a function of forming positionally correct, that is, non-inverted images. These lens component systems 13b, 13c, 13d, etc. are composed of afocal optical systems 11b, 11c, 11d, etc. and image-forming optical systems 12b, 12c, 12d, etc., respectively.

The afocal optical systems 11b, 11c, 11d, etc. each send out the collimated beam when a collimated beam is incident thereto. In addition, each of these afocal optical systems inverts an incoming light ray with respect to the center of its optical axis. All the afocal optical systems 11b, 11c, 11d, etc. are arranged in one plane perpendicular to each optical axis, and each of them is composed of at least one optical element where its refractive index is uniform. Note that each afocal optical system is a symmetric-convex lens in this embodiment.

Figure 2:
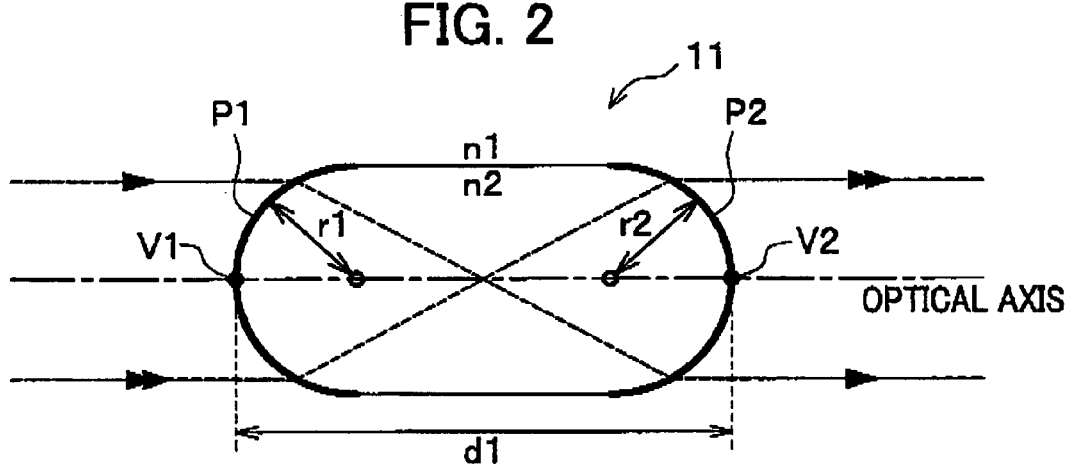
FIG. 2 is a schematic view depicting an afocal optical system of the imaging device.

Referring to FIG. 2, a description will be given below, of an afocal optical system 11 (one of the afocal optical systems 11b, 11c, 11d, etc.) that is a symmetric-convex lens. In this figure, an optical path of an optical collimated beam passing through the afocal optical system 11 is shown schematically by dotted lines. Moreover, the respective spherical surfaces of the afocal optical system 11, to which the beam is inputted and from which the beam is outputted, are shown in heavy lines.

The afocal optical system 11 takes the form of a symmetric-convex lens, and has spherical surfaces P1 and P2 at a predetermined distance away.

In this system 11, suppose that:

(1) the curvature radius of the spherical surfaces P1 and P2 is r1 and r2, respectively;

(2) the distance between points V1 and V2 is D1 (each of the points V1 and V2 is the center of the spherical surfaces, that is, the length of the afocal optical system 11 on the optical axis);

(3) the refractive index of the afocal optical system 11 is n2; and (4) the refractive index of the surroundings is n1.

From the foregoing, the focal length f1 of the afocal optical system 11 is expressed by an equation (1):

$$f1 = r1 \cdot r2 / [(n2-n1) \cdot \{r2-r1+d1(n2-n1)/n2\}]. \quad (1)$$

Note that in a typical afocal optical system, the focal length f1 is infinity. Hence, to allow the afocal optical system 11 to be an afocal system, an equation (2) needs to be established:

$$d1 = (r1-r2) \cdot n2/(n2-n1). \quad (2)$$

Especially, on the condition that the afocal optical system 11 is in air (n1≈1) and the curvature radii of the spherical surfaces P1 and P2 are equal (r1=−r2), the afocal optical system 11 simply needs to satisfy an equation (3):

$$d1 = 2 \cdot r1 \cdot n2/(n2-1). \quad (3)$$

Therefore, as long as the afocal optical system 11 meets the equation (2), a collimated beam which has been incident to the afocal optical system 11 is outputted in the form of a collimated beam. Note that the outputted beam is produced by inverting the incoming beam with respect to the optical axis.

Referring back to FIG. 1, the image-forming optical systems 12b, 12c, 12d, etc. converge incoming light from the afocal optical system 11b, 11c, 11d, etc., respectively. These image-forming optical systems are arranged in one plane perpendicular to their optical axes to thereby form an array. Furthermore, the optical axes of the image-forming optical systems are the same as those of the corresponding adjacent focal optical systems. Each image-forming optical system is composed of at least one optical element with uniform internal refractive index. Note that in this embodiment, the image-forming optical system is a plano-convex lens that has a function of converging an incoming collimated beam.

Figure 3:
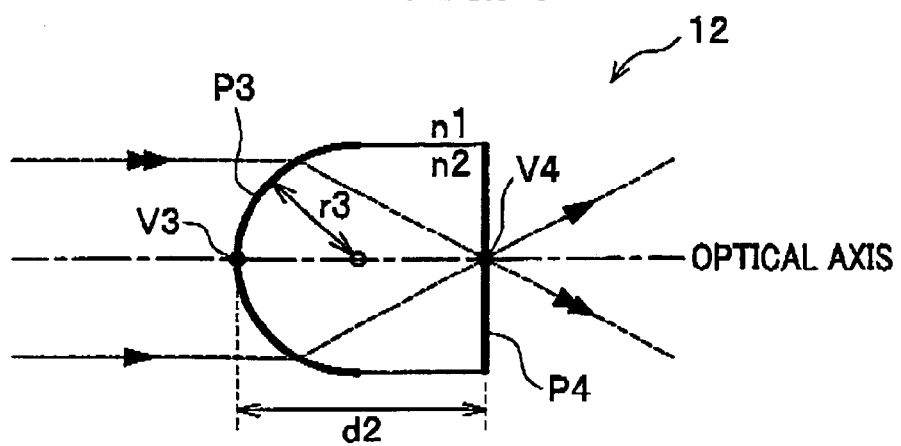
FIG. 3 is a schematic view depicting an image-forming optical system of the imaging device.

Referring to FIG. 3, a description will be given below, of an image-forming optical system 12 (one of the image-forming optical systems 12b, 12c, 12d, etc.) that is a plano-convex lens. In this figure, an optical path of an optical collimated beam which passes through the afocal optical system 12 is shown schematically by dotted lines. Moreover, the surfaces of the image-forming optical system 12 are shown in heavy lines.

The image-forming optical system 12 has the spherical surfaces P3 and the flat surface P4 at a predetermined distance away.

In this system, assume that:

(1) the curvature radius of the spherical surfaces P3 is r3;

(2) the curvature radius of the flat surface P4 is r4 (infinity);

(3) the distance between a point V3 (center of P3) and V4 (center of P4) is d2;

(4) the refractive index of the image-forming optical system 12 is n2; and (5) the refractive index of the surroundings is n1, From the foregoing, the focal length f2 of the image-forming optical system 12 is expressed by an equation (4):

$$f2=r3/(n2-n1). \quad (4)$$

A distance h4 between the point V4 and a principal point of the image-forming optical system 12 is expressed by an equation (5):

$$h4=-d2\cdot n2. \quad (5)$$

To converge an incoming collimated beam on the flat surface P4, the image-forming optical system 12 simply needs to satisfy an equation (6):

$$d2=n2\cdot r3/(n2-n1). \quad (6)$$

Figure 4:
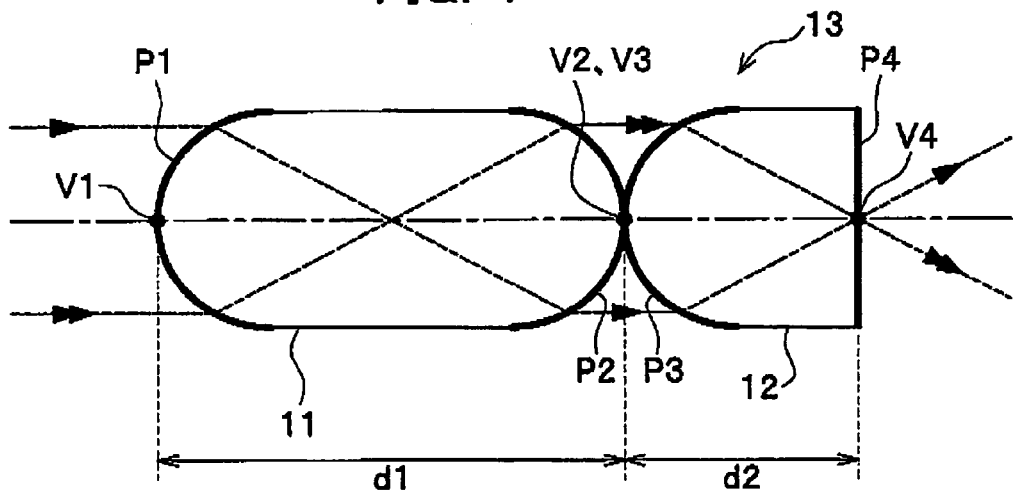
FIG. 4 is a schematic view depicting an optical path of a collimated beam incident to a lens component of the imaging device.

It is assumed that the afocal optical system 11 and the image-forming system 12 satisfy the equations (2) and (6), respectively. Now, if a collimated beam enters the systems 11 and 12 in this order, then the outputted beam converges on the point V4, as shown in FIG. 4.

Suppose that the object 16 (see FIG. 1) is at a distance L1 away from the point V1. Following this, light emitted from the object 16 is incident to the lens component system 13, and the incident light then converges on a point that is at a distance L2 away from the point V4. In this case, the relation between the distances L1 and L2 can be given by an equation (7):

$$L2=-(r1)^2/[(n2-n1)\cdot\{L1\cdot(n2-n1)+3\cdot r1\}]. \quad (7)$$

where the respective curvature radii of P1, P2 and P3 are equal (r1=−r2=r3), and the length d1 is twice as long as the length d2 (d1=2·d2).

Figure 5:
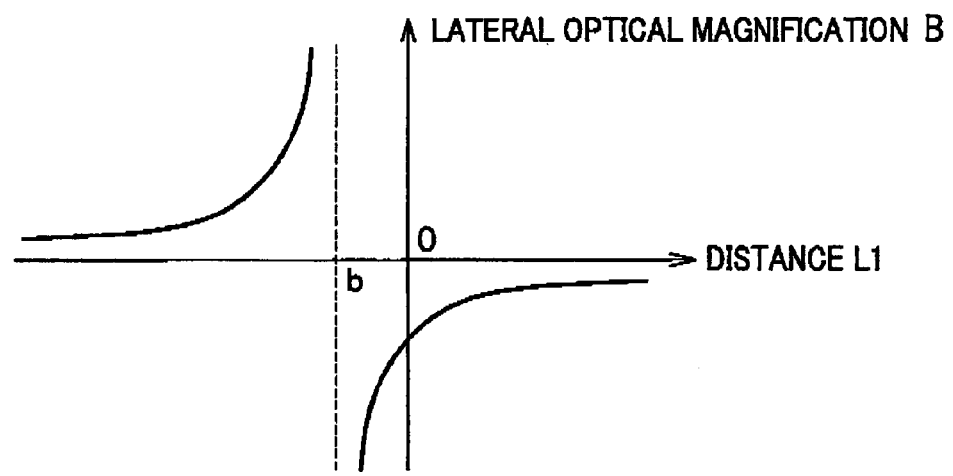
FIG. 5 is a graph showing a relation of a lateral optical magnification (of an image focused by the lens component) to a distance (between an object and a top spherical surface of the afocal optical system)

A description will be given below, of the optical magnification of image of the object 16 (see FIG. 1), with reference to FIGS. 4 and 5. Note that in FIG. 4, a lens component system 13 refers to one of the lens component systems 13b, 13c, 13d, etc. of FIG. 1. Referring to FIG. 5, a point b represents a distance the between the point V1 and a focal point (not shown) of the afocal optical system 11 on the object side.

As shown in FIG. 5, if the distance L1 is less than the length b, in other words, if the object 16 is closer to the afocal optical system 11 than the focal point (at the object side) of the lens component system 13, then the lateral optical magnification β is of a negative value. Therefore, the image produced by the lens component system is inverted. Otherwise, if the distance L1 is greater than the length b, in other words, if the object 16 is farther away from the afocal optical system 11 than the focal length, then the lateral optical magnification β is of a positive value. Consequently, the produced image is non-inverted.

Figure 23B:
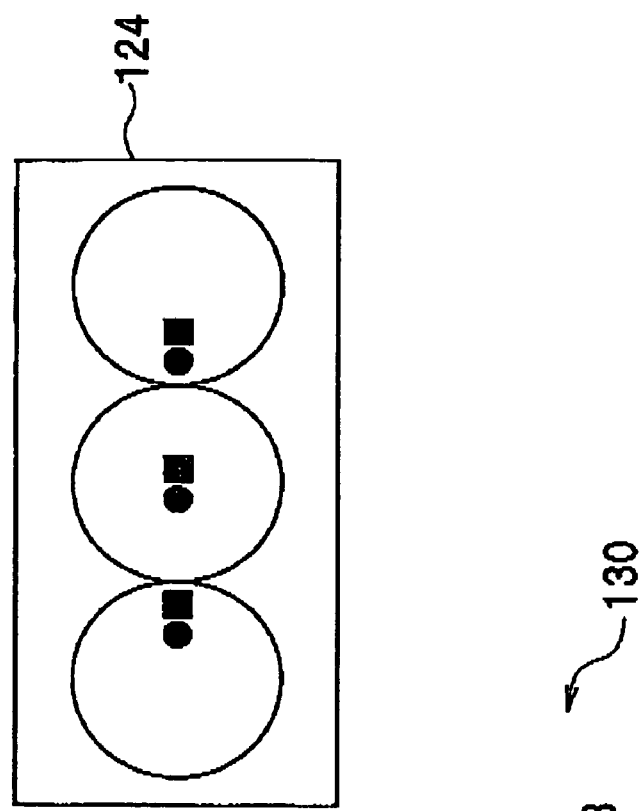
FIG. 23B is a schematic view depicting the image presented on a display of the display device.
Figure 23A:
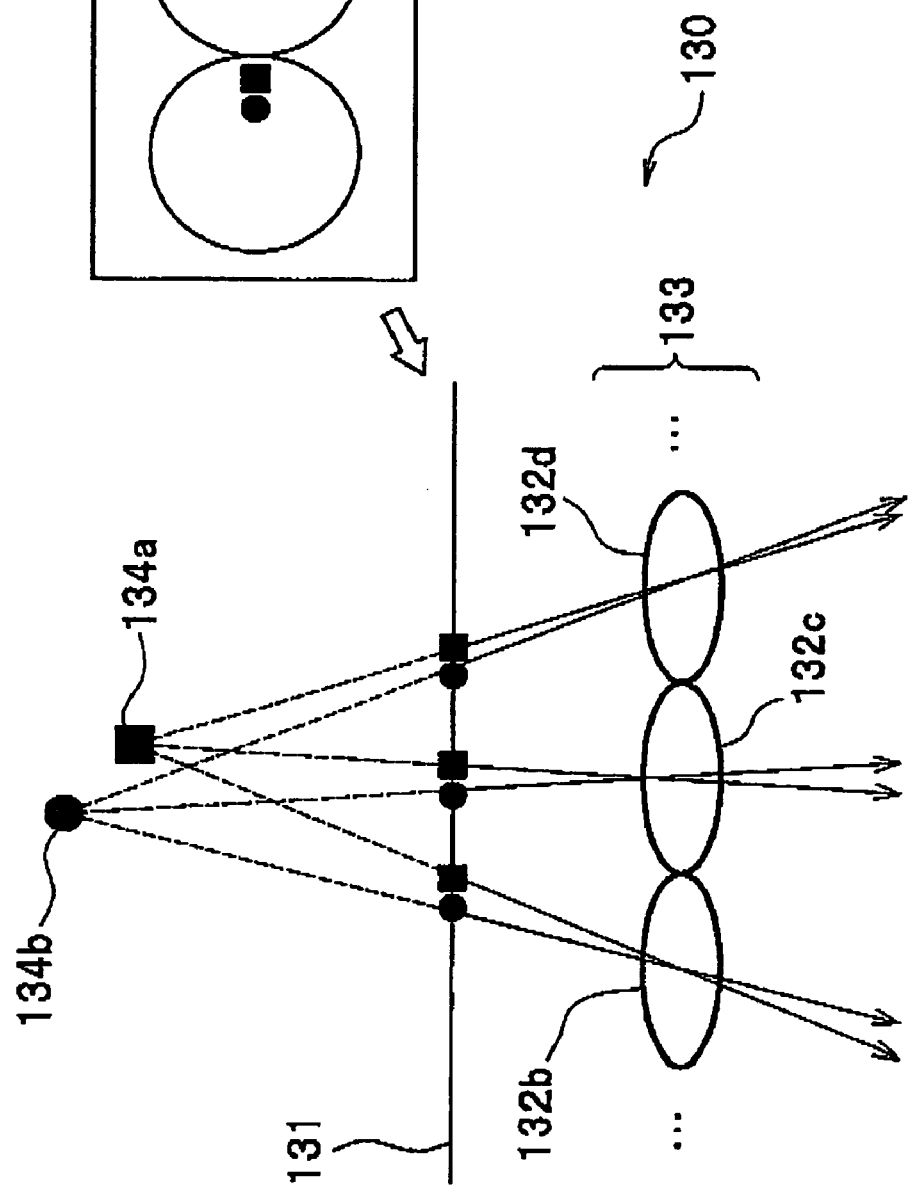
FIG. 23A is a schematic view depicting a configuration of a display device according to the IP technique and a mode in which an image of objects are displayed in three dimensions by the display device.

Referring back to FIG. 1, the object 16 is focused by the lens component systems 13b, 13c, 13d, etc. of the lens component group 14. Subsequently, the photographic film (image capturing mechanism) 15 captures the image of the object 16. As described above, if the object 16 is farther away from the afocal optical systems 11b, 11c, 11d, etc. than the individual focal lengths of the lens component systems 13b, 13c, 13d, etc., then the images produced by the lens component systems 13b, 13c, 13d, etc. are non-inverted. The image captured by the photographic film 15 is presented on a typical display according to the IP technique such as the display device 130 of FIG. 23A. As a result, a person (viewer) can see a 3D image of the object 16.

In this embodiment, the imaging capturing mechanism for picking up the image is implemented by the photographic film 15. However, the present invention is not limited thereto. Alternatively, the imaging capturing mechanism may be any component such as a photoelectric conversion element or charge transfer device, as long as being capable of picking up the image focused by the image-forming optical systems. Furthermore, the photographic film 15 is placed across the optical path of light outputted from the image-forming optical systems 12b, 12c, 12d, etc. The length L2 between each image-forming optical system and the photographic film 15 on the optical axis may be set depending on the position of the object 16 and based on the equation (7). To give an example, if the object 16 which is at an infinite distance away from the afocal optical systems 11b, 11c, 11d, etc. is captured, then the photographic film 15 needs to be located in contact with the surfaces of the image-forming optical system 12b, 12c, 12d, etc. This enables IP images of the object 16 to be captured in correct orientation.

In this way, it is possible to capture the IP images of the object 16 by using the imaging device 1. Hence, the images captured by the imaging device 1 do not need to be subjected to a computing process for converting inverted images to non-inverted images. Moreover, each of the lens component systems 13b, 13c, 13d, etc. can be realized by combining less expensive convex lenses such as asymmetric-convex lenses and plano-convex lenses. Accordingly, the imaging device 1 can have a simpler and less expensive configuration than that of conventional imaging devices having an inverting conversion optical system composed of prisms or a graded-index lens such as an optical fiber.

It is preferable that the side surface (parallel to the optical axis) of each lens component system be subjected to a light shielding process, so that light is not leaked from between the individual lens component systems. Furthermore, if the lens component systems and the photographic film 15 are arranged at a predetermined distance away from each other, then a light shielding plate may be provided around the side of the lens component group 14. This plate prevents the generation of stray light from the lens component systems.

[Function of Imaging Device]

Next, a description will be given below, of functions for capturing the IP images of the object 16 by using the imaging device 1, with reference to FIG. 1.

Light from the object 16 enters the afocal optical systems 11b, 11c, 11d, etc. of the lens component systems 13b, 13c, 13d, etc. constituting the lens component group 14, respectively. The incoming light rays are inverted in the afocal optical systems with respect to their optical axes, and the rays are then sent out therefrom.

The light having passed through the afocal optical systems 11b, 11c, 11d, etc. is incident to the image-forming optical systems 12b, 12c, 12d, etc. The incident light is re-inverted in the image-forming optical systems, and it then converges to produce the image of object 16 in correct orientation. The focus location of the produced image on the optical axis can be determined based on the equation (7). Finally, the produced image is captured by the photographic film 15. By performing the above functions, the imaging device 1 captures the IP images of the object 16.

In this embodiment, the location of the photographic film 15 on the optical axis is varied depending on the position of the object 16. However, the present invention is not limited thereto. Alternatively, the length d2 (see FIG. 3) of the image-forming optical system 12 may be changed. In this way, the IP images of the object 16 are captured, with the photographic film 15 being kept in contact with the flat surface P4 (see FIG. 3) of the image-forming optical system 12.

The length d2 of the image-forming optical system 12 on the optical axis is adjusted, depending on the position of the object 16, so that the image of the object 16 is focused on the flat surface P4 of the image-forming optical system 12. This function will be described with reference to FIGS. 2, 3 and 6.

Figure 6:
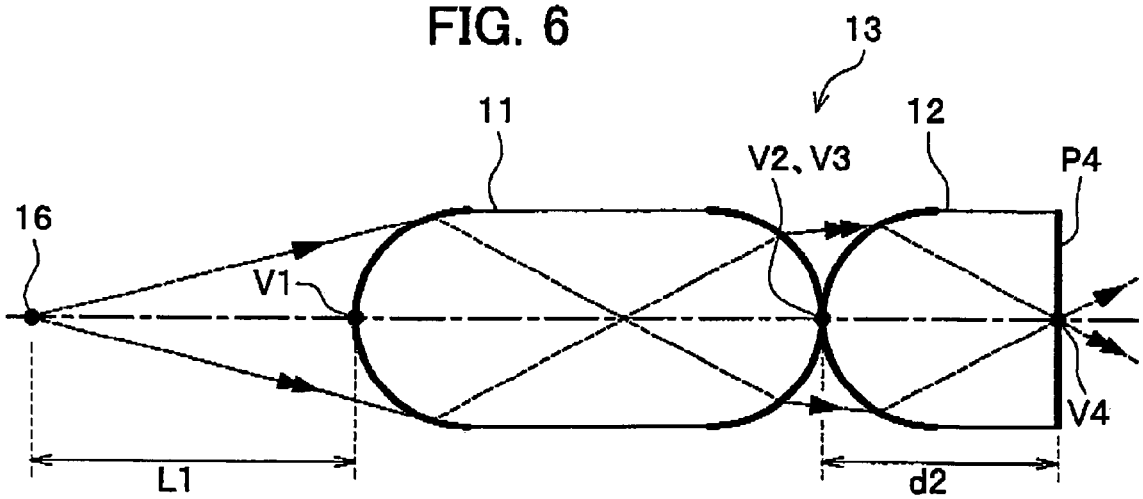
FIG. 6 is a schematic view depicting a configuration of the lens component that focuses an image of an object on a surface of the image-forming optical system.

In FIG. 6, the distance L1 stands for the distance between the object 16 and the point V1 on the spherical surface, and the distance L2 refers to the distance between the produced image and the point V4 on the flat surface P4. The relation between the distances L1 and L2 is given by an equation (8):

$$L2 = w1 + w2$$

$$w1 = -r1 \cdot \{L1 \cdot (n2-n1) + 4 \cdot r1\} / [(n2-n1) \cdot \{L1 \cdot (n2-n1) + 3 \cdot r1\}]$$

$$w2 = \{2 \cdot r1 - (n2-n1) \cdot (d2/n2)\}/(n2-n1) \quad (8)$$

where the respective curvature radii of the spherical surfaces P1, P2 and P3 are equal (r1=−r2=r3).

Accordingly, the length d2 of the image-forming optical system 12 on the optical axis is set depending on the position of the object 16 and based on the following equation (9). Consequently, the image of the object 16 can be focused on the flat surface P4:

$$d2 = w3/(n2-n1)$$

$$w3 = 2 \cdot r1 - r1 \cdot \{L1(n2-n1) + 4 \cdot r1\} / \{L1(n2-n1) + 3 \cdot r1\} \quad (9)$$

By maintaining these relations, the photographic film 15 is always in contact with the flat surface P4 of the image-forming optical system 12. Thus, the imaging device 1 can capture the IP image of the object 16.

Alternatively, the curvature radii r1 and r2 (of the afocal optical system 11) and the curvature radius r3 (of the image-forming optical system 12) may be changed depending on the position of the object 16, so that the image of the object 16 is focused on the flat surface P4 of the image-forming optical system 12. This function will be described with reference to FIGS. 2, 3 and 6.

Now, the relation of the distances L1 and L2 is expressed by an equation (10):

$$L2 = w4 + w5$$

$$w4 = -(n2-n1)(L1 + 2 \cdot r3 + 2 \cdot r1)/\{r3 \cdot (L1 + 2 \cdot r3 + 2 \cdot r1) - (n2-n1)^2\}$$

$$w5 = \{2 \cdot r1 - (n2-n1) \cdot (d2/n2)\}/(n2-n1) \quad (10)$$

where the respective curvature radii of the spherical surfaces P1 and P2 are equal (r1=−r2).

Hence, in the equation (10), the curvature radii r1, r2 and r3 and the length d2 are set depending on the position of the object 16, so that the distance L2 between the point V4 and the image is 0. As a result, the imaging device 1 can capture the IP image of the object 16, with the photographic film 15 being kept in contact with the flat surface P4 of the image-forming optical system 12.

In the above-described configurations of the imaging device 1, the light from the object 16 passes through the afocal optical systems 11b, 11c, 11d, etc., and it then enters the image-forming optical systems 12b, 12c, 12d, etc., as shown in FIG. 1. However, the present invention is not limited thereto. Alternatively, on the principle of reversibility of light, the light may be first incident to image-forming optical system 12'b, 12'c, 12'd, etc., and then, to afocal optical system 11b', 11b', 11b', etc., as shown in FIGS. 7A and 7B.

Figure 7A:
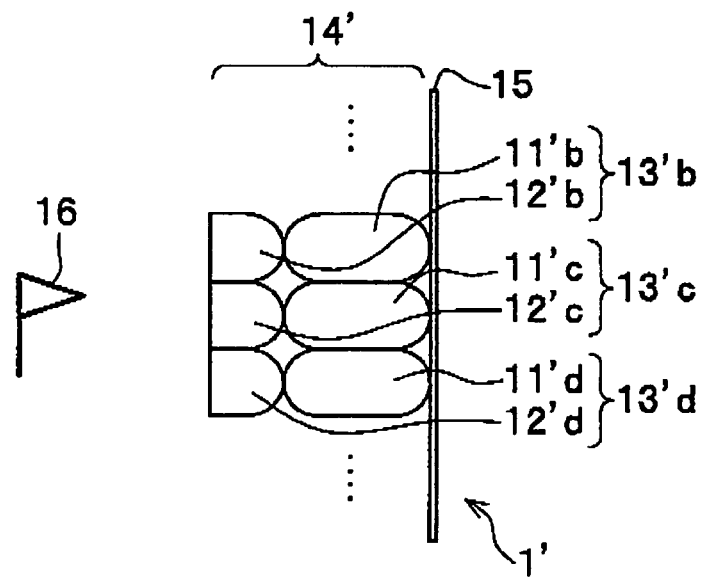
FIG. 7A is a schematic view depicting an alternative configuration of the imaging device.
Figure 7B:
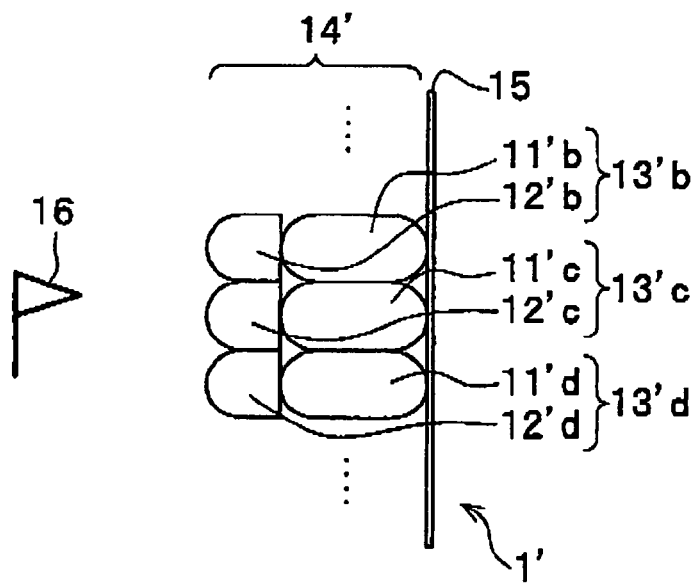
FIG. 7B is a schematic view depicting an alternative configuration of the imaging device.

In FIG. 7A, it is assumed that the afocal optical systems 11'b, 11'c and 11'd and the image-forming optical systems 12'b, 12'c and 12'd, which make up lens component system 13'b, 13'c and 13'd, respectively, have the same optical property as those of FIG. 1. In addition, it is assumed that each afocal optical system and each image-forming optical system have the same curvature radius, and have the same internal refractive index. In this case, in the imaging device 1' of FIG. 7A, a principal point on the image side (second principal point) of each lens component system is far away from the edge of the system by a distance Δ1' expressed by the following equation (11). In addition, a focal point on the image side (second focus) of each lens component system is far away from its edge by a distance S1' expressed by the following equation (12):

$$\Delta 1' = 4 \cdot r1/(n2-n1) \quad (11)$$

$$S1' = 3 \cdot r1/(n2-n1) \quad (12)$$

where r1 stands for a curvature radius of an asymmetric-convex lens and plano-convex lens (the afocal optical system and the image-forming optical system), n1 stands for the refractive index of the surroundings, and n2 stands for the refractive index of each lens. As described above, in this embodiment, all the curvature radii of curved surfaces of each afocal optical system and each image-forming optical system are equal (r1=−r2=r3), and all the internal refractive indexes of each afocal optical system and each image-forming optical system are also equal (n2). However, make sure to note that the present invention is not limited thereto.

In FIG. 7A, the photographic film 15 may be placed depending on the location of an object to be focused. Especially when an object at infinity is captured, the photographic film 15 needs to be placed far away from the edges of the lens component systems by the distance S1' expressed by the following equation (12).

In FIG. 7B, under the same condition of the above description of FIG. 7A, a principal point on the image side of each lens component system is far away from its edge by a distance Δ2' expressed by the following equation (13). In addition, a focal point on the image side of each lens component system is far away from its edge by a distance S2' expressed by the following equation (14):

$$\Delta 2' = 3 \cdot r1/(n2-n1) \quad (13)$$

$$S2' = 2 \cdot r1/(n2-n1) \quad (14)$$

In FIG. 7B, the photographic film 15 may be placed depending on the location of an object to be focused. Especially when an object at infinity is captured, the photographic film 15 needs to be placed far away from the edges of the lens component systems by the distance S2' expressed by the following equation (14).

Figure 8:
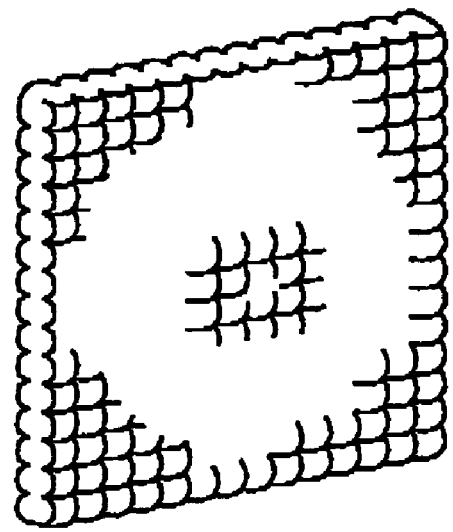
FIG. 8 is a schematic view depicting an alternative configuration of the afocal optical systems.
Figure 9:
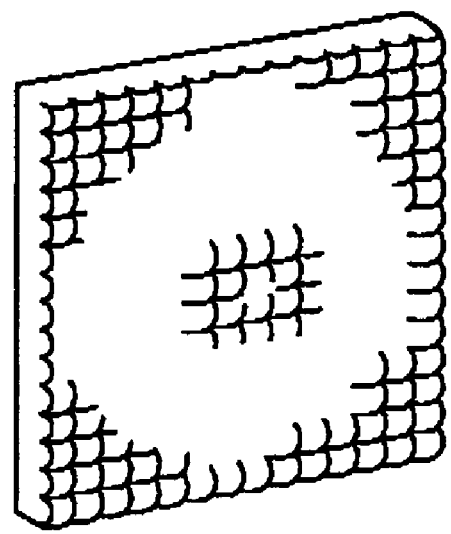
FIG. 9 is a schematic view depicting an alternative configuration of the image-forming systems.

Furthermore, the afocal optical systems in each of the imaging devices 1 and 1' correspond to the independent asymmetric-convex lenses, and the image-forming systems thereof correspond to the independent plano-convex lenses. However, the present invention is not limited thereto. Alternatively, the afocal optical systems may be implemented by an integrated array of the asymmetric-convex lenses, as shown in FIG. 8. Furthermore, the image-forming systems may be implemented by an integrated array of the plano-convex lenses, as shown in FIG. 9. This makes it possible to allow the afocal optical systems and the image-forming systems to be aligned easily. In this case, the array of the asymmetric-convex lenses can be formed by bonding together the individual flat surfaces of the two plano-convex lens arrays.

In addition, in FIGS. 8 and 9, both of the integrated arrays are of a sheet shape, although the present invention is not limited thereto. Alternatively, they may have any shape such as a circle, hexagon or octagon.

Second Embodiment

[Configuration of Imaging Device]

A detailed description will be given below, of a configuration of an imaging device 1A according to a second embodiment of the present invention, with reference to FIGS. 10 to 13.

Figure 10:
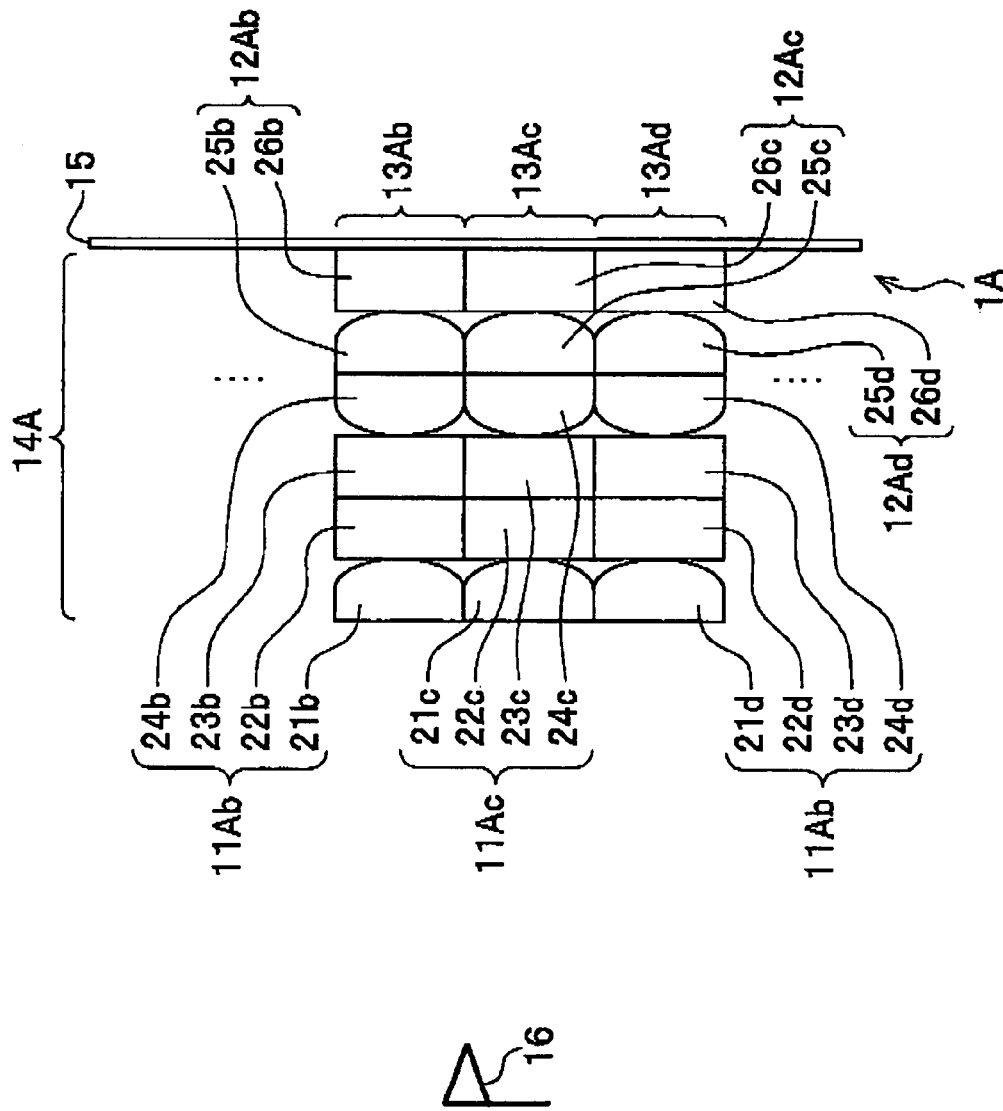
FIG. 10 is a schematic view depicting an imaging device according to a second embodiment of the present invention.

Referring to FIG. 10, the imaging device 1A has a function of capturing the IP images of the object 16, and it includes a lens component group 14A and the photographic film 15. This imaging device 1A is identical to the imaging device 1 of FIG. 1 except that it includes the lens component group 14A instead of the lens component group 14. The lens component system 13Ab, 13Ac, 13Ad, etc. is composed of an afocal optical system 11Ab, 11Ac, 11d, etc. and an image-forming optical system 12Ab, 12Ac, 12Ad, etc., respectively. The same reference numerals are given to the same parts as those already described in the first embodiment, and duplicate description is therefore omitted.

The lens component group 14A is composed of an array of the lens component systems 13Ab, 13Ac, 13As, etc, arranged in one plane perpendicular to their individual optical axes. Each of these lens component systems creates non-inverted images.

Figure 11:
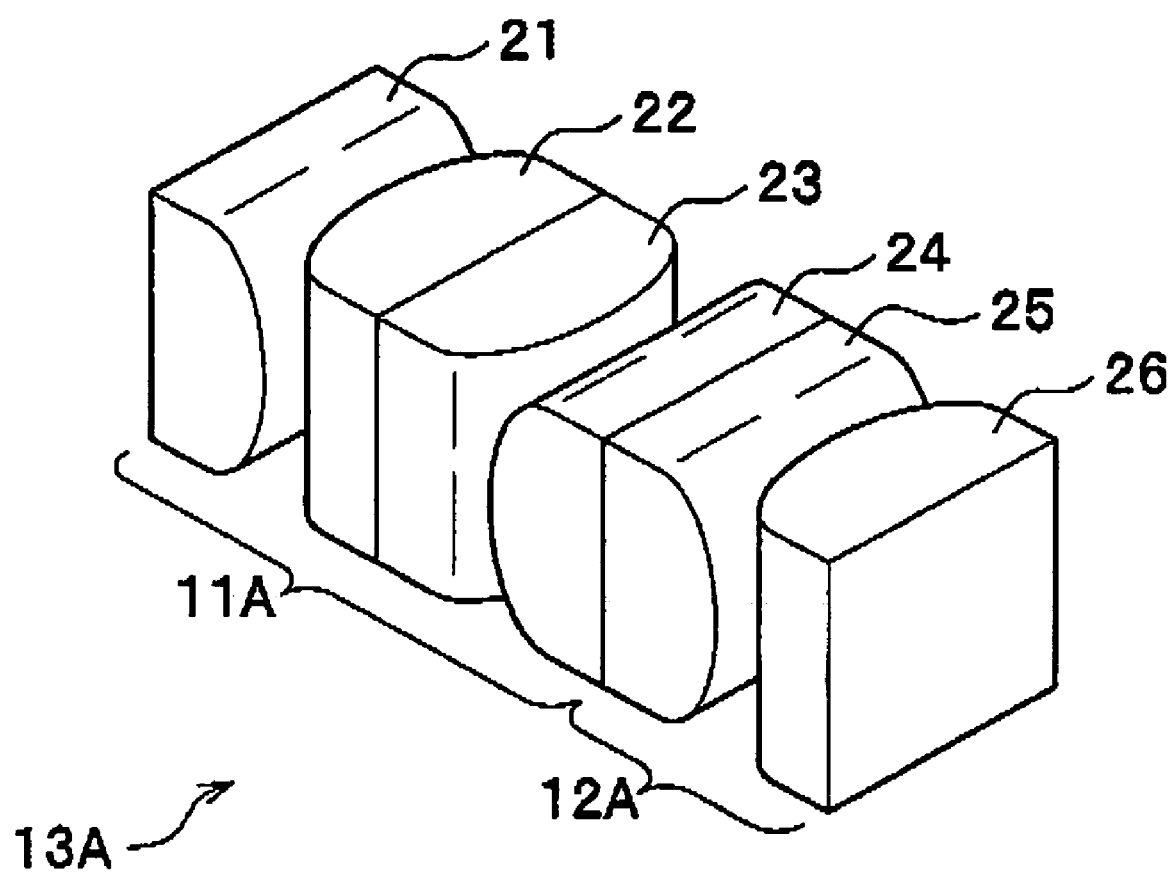
FIG. 11 is a schematic view depicting a configuration of a lens component of the imaging device.

With reference to FIG. 11, a function of each lens component will be described. As shown in this figure, a lens component system 13A (one of the lens component systems 13Ab, 13Ac, 13Ad, etc.) is composed of an afocal optical system 11A (one of the afocal optical systems 11Ab, 11Ac, 11Ad, etc.) and an image-forming optical system 12A (one of the image-forming optical systems 12Ab, 12Ac, 12Ad, etc.).

The afocal optical system 11A inverts the light ray from the object 16 with respect to its optical axis, and it is composed of cylindrical lens 21, 22, 23 and 24.

These cylindrical lenses 21, 22, 23 and 24 each have uniform refractive index and one curved surface. In addition, each cylindrical lens converges or diverges an incoming light ray along one axis perpendicular to the optical axis. These cylindrical lenses 21, 22, 23 and 24 are aligned on the optical axis in this order.

Figure 12A:
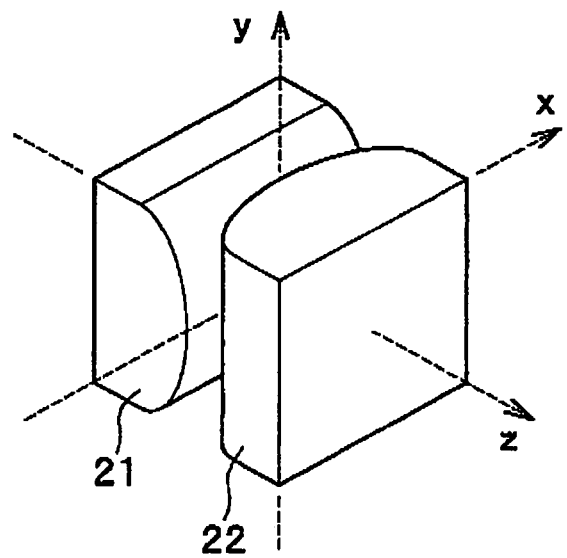
FIG. 12A is a schematic view depicting an arrangement of two cylindrical lenses constituting the lens component.
Figure 12B:
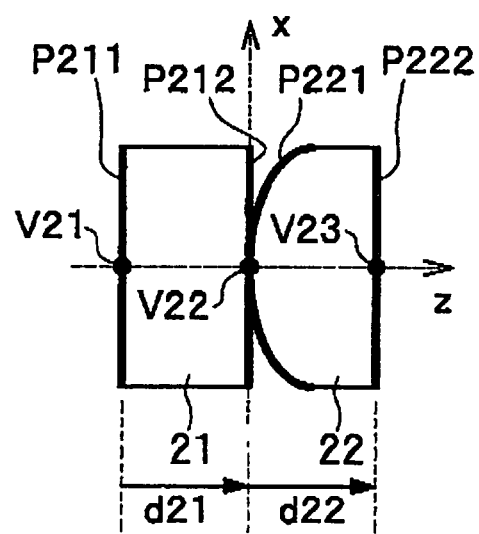
FIG. 12B is a top view of the cylindrical lenses of the FIG. 12A.
Figure 12C:
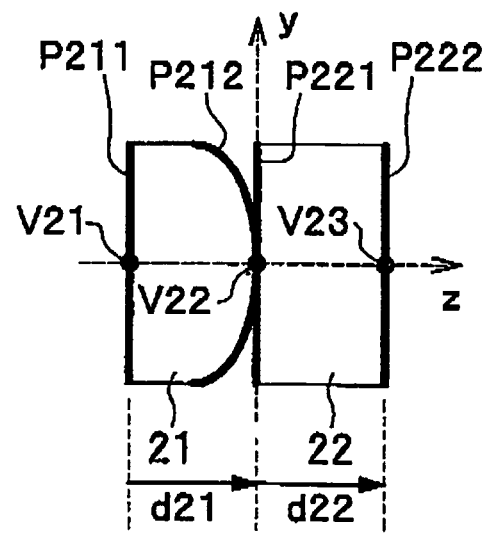
FIG. 12C is a side view of the cylindrical lenses of the FIG. 12A.

Referring to FIGS. 12A to 12C, the function of the cylindrical lenses 21 and 22 will be described. In these figures, a Z axis is parallel to the optical axis, an X axis is perpendicular to the optical axis and extends horizontally between the lenses 21 and 22, and a Y axis is perpendicular to the optical axis and extends vertically between the lenses 21 and 22. Furthermore, a flat surface P211 and a curved surface P212 of the cylindrical lens 21 and a curved surface P221 and a flat surface P222 of the cylindrical lens 22 are shown in heavy lines.

The cylindrical lens 21 has the flat surface P211 to which light from the object 16 is incident, and the curved surface P212 from which the incoming light is sent out. The flat surface P211 has infinite curvature radii on the X and Y axes, and the curved surface P212 has infinite curvature radius on the X axis and curvature radius "r21y" on the Y axis.

The cylindrical lens 22 has the curved surface P221 to which the light passing through the cylindrical lens 21 is incident, and the flat surface P222 from which the light is sent out. In addition, the cylindrical lens 22 is in contact with the cylindrical lens 21 at a point V22 on the curved surface P212. The curved surface P221 has curvature radius "r22x" on the X axis and infinite curvature radius on the Y axis, and the flat surface P222 has infinite curvature radii on the X and Y axes.

The cylindrical lens 21 converges the incoming light on the Y axis and, then outputs the light. Following this, the cylindrical lens 22 converges the incoming light on the X axis and, then outputs the light. In this way, a pair of cylindrical lenses 21 and 22 acts as a single plano-convex lens.

In the above arrangement, suppose that:

(1) a distance between a point V21 (of the flat surface P211) and the point V22 (on which the curved surfaces P212 and P221 are in contact with each other), that is, a thickness of the cylindrical lens 21 on the optical axis is d21;

(2) a distance between the point V22 and a middle point V23 of the flat surface P222, that is, a thickness of the cylindrical lens 22 on the optical axis is d22; and (3) the curvature radii of the cylindrical lenses 21 and 22 are equal (r22x=r21y) and their thicknesses on the optical axis are equal (d21=d22).

In this case, individual focal lengths f7 of the cylindrical lenses 21 and 22 are identical, and this length can be expressed by an equation (15):

$$f7 = r22x/(n12 - n11) \tag{15}$$

where the refractive index of the cylindrical lens 21 and 22 is n12, and that of the surroundings is n11.

By setting the thickensses d21 and d22 so as to meet the following equation (16), the beam is focused on the middle point V23 of the flat surface P222 of the cylindrical lens 22 when a collimated beam enters the cylindrical lens 21:

$$d21 = d22 = n12 \cdot r22x/(n12 - n11) \tag{16}$$

As shown in FIG. 11, the afocal optical system 11A is composed of two pairs of cylindrical lenses, and in each pair (lenses 21 and 22, or 23 and 24), the curved surfaces facing each other, with their curved lines being perpendicular to each other. Consequently, it is possible for the afocal optical system 11A to have the same function as that of the afocal optical system 11 of FIG. 2. The arrangement of the cylindrical lenses 21, 22, 23 and 24 on the optical axis is not limited to that of this embodiment. Alternatively, the cylindrical lenses 21 and 24, which both converge or diverge the light from the object 16 vertically, may be arranged adjacent to each other. Following this, cylindrical lenses 22 and 23, which both converge the light from the lens 21 or 24 horizontally, may be arranged adjacent to each other.

The image-forming optical system 12A converges the light outputted from the afocal optical system 11A. The image-forming optical system 12A has the same axis as that of the afocal optical system 11A. In addition, the image-forming optical system 12A is composed of cylindrical lenses 25 and 26.

The curved line of the cylindrical lens 25 is perpendicular to that of the cylindrical lens 26, and both surfaces have the same curvature radius, In addition, both lenses have the same thickness on the optical axis. Accordingly, a pair of cylindrical lenses 25 and 26 acts as a plano-convex lens.

As describe above, the afocal optical system 11A and the image-forming optical system 12A of the lens component system 13A are constituted of multiple cylindrical lenses. Thus, the imaging device 1A in made of a combination of less expensive optical components.

Figure 13:
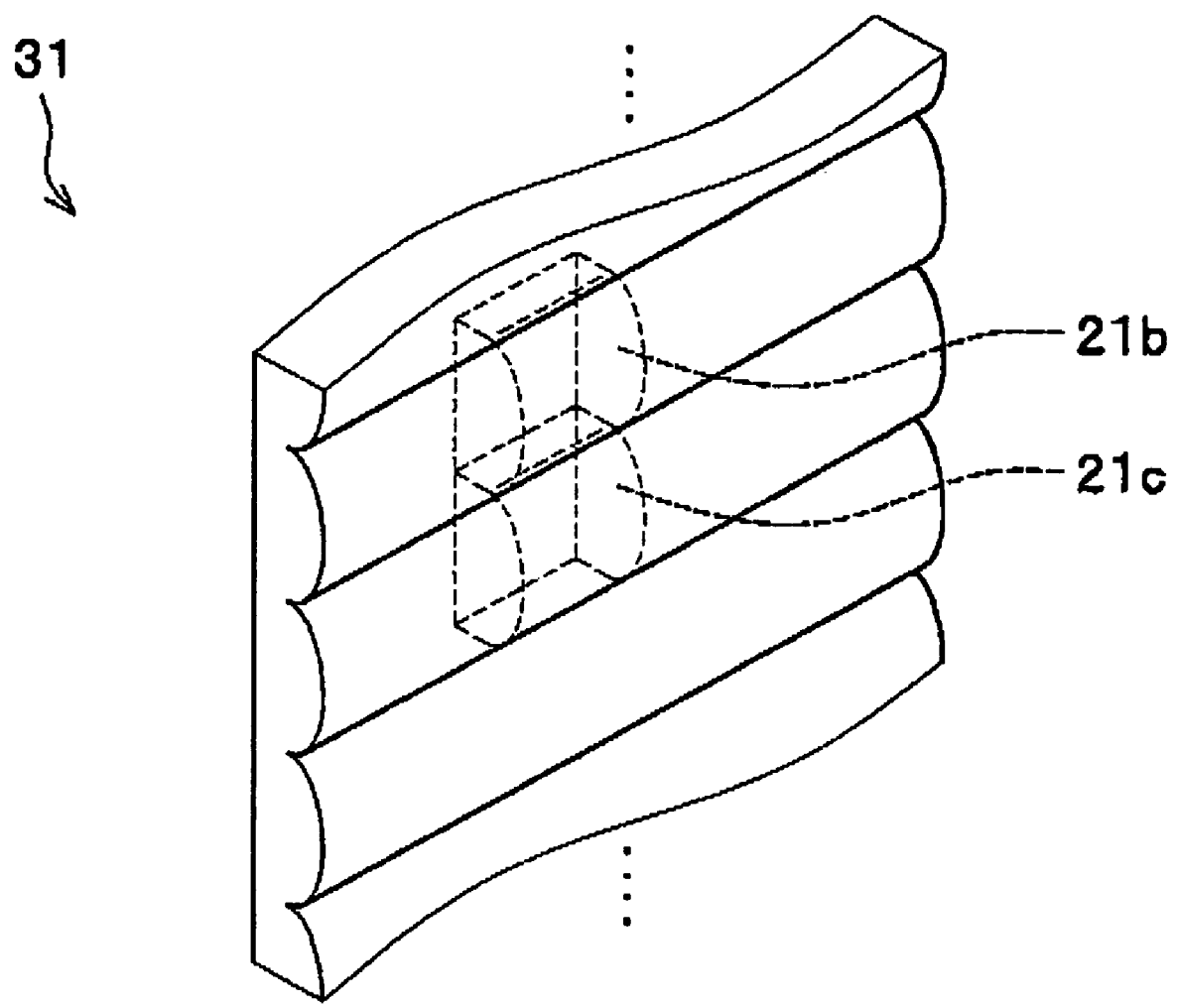
FIG. 13 is a schematic view depicting a cylindrical lens component group formed by integrating the cylindrical lenses.

Each of the lens component systems 13Ab, 13Ac, 13Ad, etc. may be constituted of separated cylindrical lenses. Alternatively, it may be an integrated cylindrical lens component group 31 as shown in FIG. 13, thus making the assembly of the imaging device 1A easy.

Furthermore, in this embodiment, both of each afocal optical system and each image-forming optical system are formed of the combination of the cylindrical lenses. However, the present invention is not limited thereto. Alternatively, one of both the systems may be formed of the combination of the cylindrical lenses, and the other may be formed of an optical element such as a convex lens.

The above-mentioned imaging devices 1, 1' and 1A are each formed of optical elements with uniform internal refractive index, but they may be formed of optical elements in which the refractive index is changed in the radial and optical axis directions.

Figure 15C:
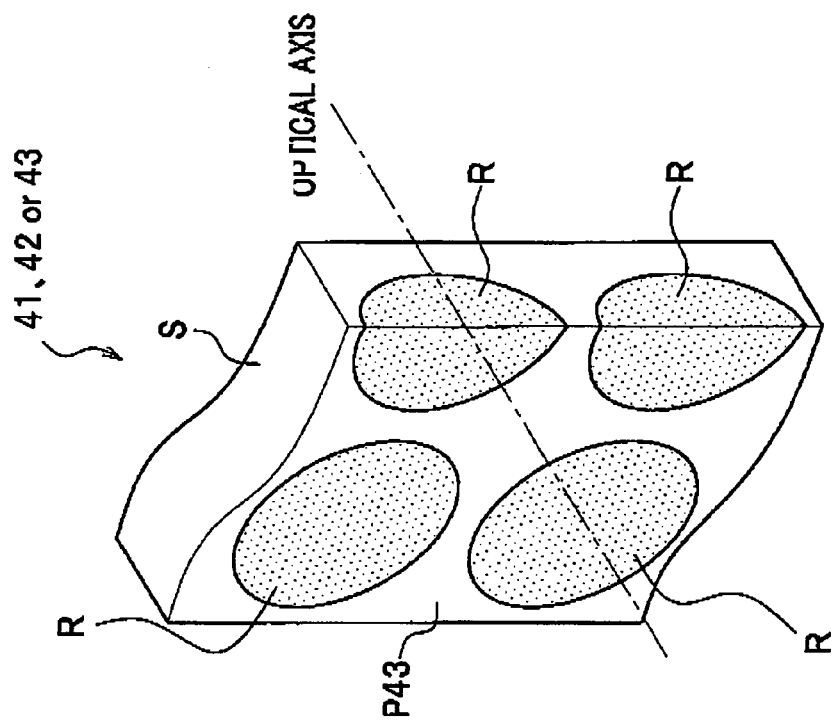
FIG. 15C is a perspective view depicting the optical element having multiple graded index regions.
Figure 15A:
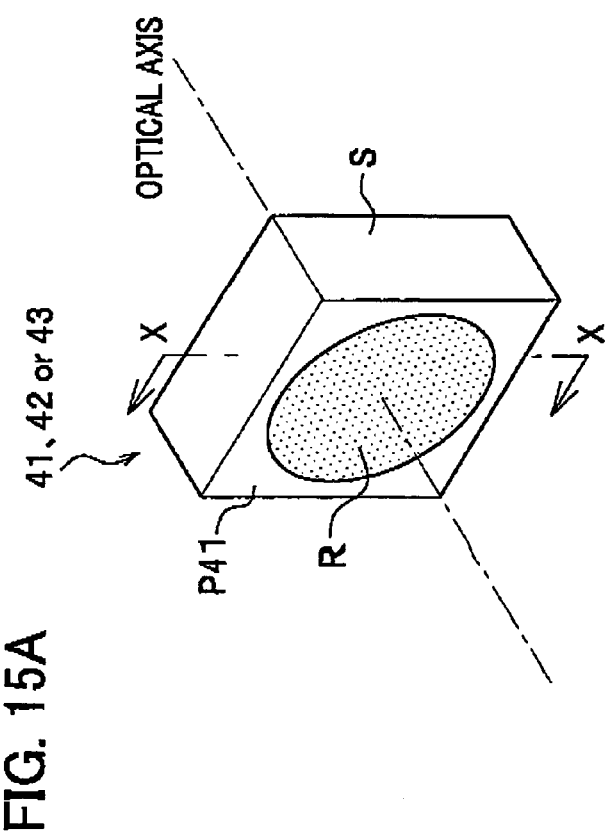
FIG. 15A is a perspective view depicting the optical element.
Figure 15B:
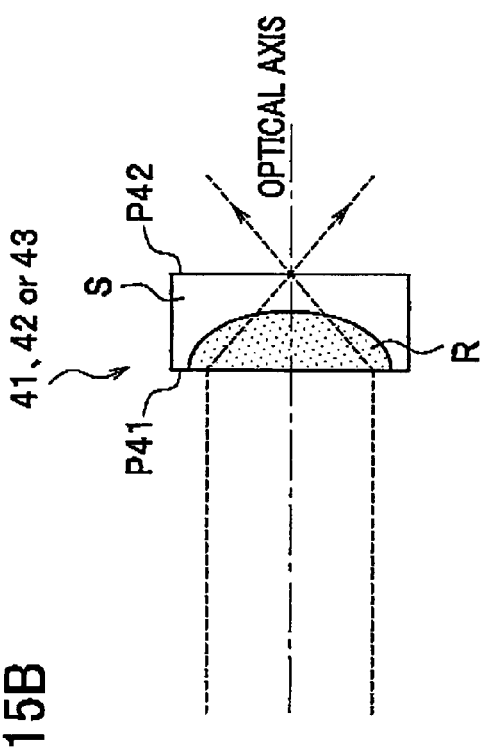
FIG. 15B is a cross-sectional view taken along a line x-x of FIG. 15A.
Figure 16:
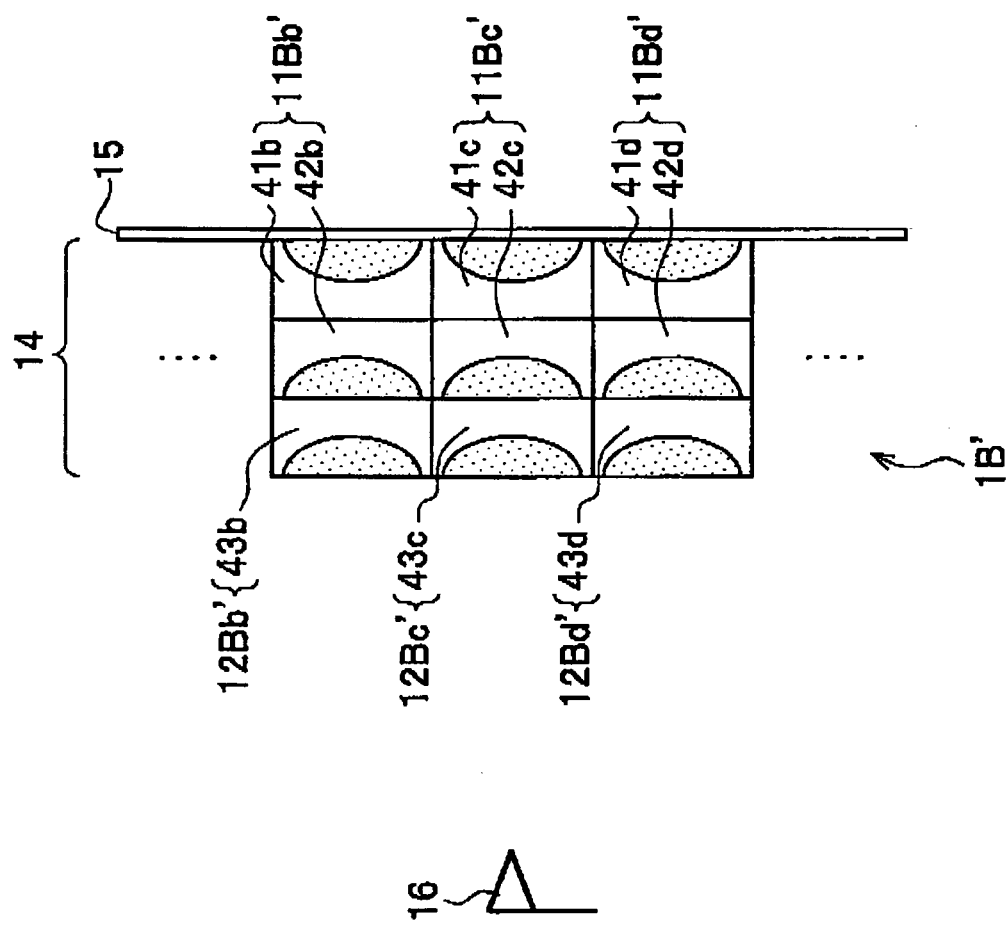
FIG. 16 is a schematic view depicting an alternative configuration of the imaging device including the afocal optical systems and the image-forming optical systems, each of which is the optical element.

With reference to FIGS. 14 to 16, a detailed description will be given below, of afocal optical systems 11Bb, 11Bc, 11Bd, etc. and image-forming optical systems 12Bb, 12Bc, 12Bd, etc. Each of these systems is made of optical elements where the reflective index is changed in its radial and optical axis directions.

Referring to FIG. 14, the afocal optical systems 11Bb, 11Bc, 11Bd, etc. are made of optical elements 41b, 41c, 41d, etc. and optical elements 42b, 42c, 42d, etc., respectively. Every element has the refractive index changed in its radial and the optical axis directions. In addition, image-forming optical systems 12Bb, 12Bc, 12Bd, etc. are optical elements 43b, 43c, 43d, etc., respectively.

Referring to FIGS. 15A to 15C, an optical element 41 refers to one of the elements 41b, 41c, 41d, etc., an optical element 42 refers to one of the elements 42b, 42c, 42d, etc., and an optical element 43 refers to one of the elements 43b, 43c, 43d, etc. In addition, an optical path of a collimated beam incident to the optical elements 41, 42 or 43 is shown schematically in dotted lines.

The optical element 41, 42 or 43 includes a substrate S and a graded index region R formed within the substrate S. Note that the refractive index of the graded index region R is higher than that of the substrate S. The substrate S is subjected to monomer exchange if being formed of plastic, or the substrate S is subjected to ion exchange or electro-migration if being formed of glass. As a result, the graded index region R is formed within the substrate S (see K. Oikawa and K. Iga, "Distributed-index planar micro-lens" Appl. Opt., vol. 21, No. 6, pp. 1052 to 1056, 1982). In this graded index region R, its refractive index is changed on its radial and optical axis directions.

Conventionally, a conventional lens array (not shown) is made of graded index optical fibers, each of which is formed by subjecting ion exchange to a fiber material. Furthermore, these optical fibers are bundled to thereby form a lens array. However, arranging multiple fibers on the same level causes difficulty. In contrast, the optical element 41, 42 or 44 can be formed to have any shape such as a square. It is thus easy to arrange these elements on the same level. As shown in FIG. 15C, the optical element 41, 42 or 43 in which the multiple graded index areas R are arranged can be formed as a lens component group by subjecting ion exchange to multiple spots on a surface P43 of the substrate S.

Because of these areas R, when a collimated beam enters the optical element 41, 42 or 43, the element converges the beam, as shown in FIG. 15B. In this embodiment, the substrate S is formed so that its thickness is equal to a focal length of each graded index area R. In other words, the collimated beam is converged on a surface P42. Therefore, as shown in FIG. 14, the afocal optical system 11Bb, where the optical elements 41b and 42b are arranged adjacent to one another, inverts an incoming light ray with respect to the optical axis. Following this, the image-forming optical system 12Bb converges the light ray having passed through the afocal optical system 11Bb on the photographic film 15, thereby forming the non-inverted image of the object 16 thereon. Alternatively, as shown in FIG. 16, the image-forming optical system 12Bb' and the afocal optical system 11Bb' may be arranged on the optical axis in the order of being seen from the object 16. In this case, the image-forming optical system 12Bb' forms the inverted image of the object 16, and the afocal optical system 11Bb' inverts the image with respect to the optical axis, thus creating the image of the non-inverted object 16.

In the above-described embodiments, each of the image-forming optical systems 1 and 1A has the same focal length. However, the present invention is not limited thereto. Alternatively, the image-forming optical systems may have the focal lengths different from one another, so that multiple objects (not shown) away from the image-forming optical systems by different distances are focused (see Japanese Unexamined Patent Application Publication 2003-376956).

Moreover, the object 16 to be captured by the imaging device 1, 1' or 1A may be a real image created, by convex lenses, etc. on the edge on the object side of the lens component groups 14, 14' or 14A, or on the position shifted from the edge toward the photographic film 15. In addition, in these embodiments, the image created by the lens component groups 14, 14' or 14A is captured by the photographic film 15, but the present invention is not limited thereto. The image capturing mechanism according to the embodiments may be any mechanism as long as the image can be captured. Examples of the image capturing mechanism include a set of a charge coupled device (CCD) and a complementary metal oxide semiconductor (CMOS) and a combination of the above set and an image intensifier. In this case, the above image capturing mechanism may pick up the image directly or through an objective lens. In this case, it is preferable that a field lens be placed where the photographic film 15 is to be positioned.

[Configuration of Display Device]

Figure 17:
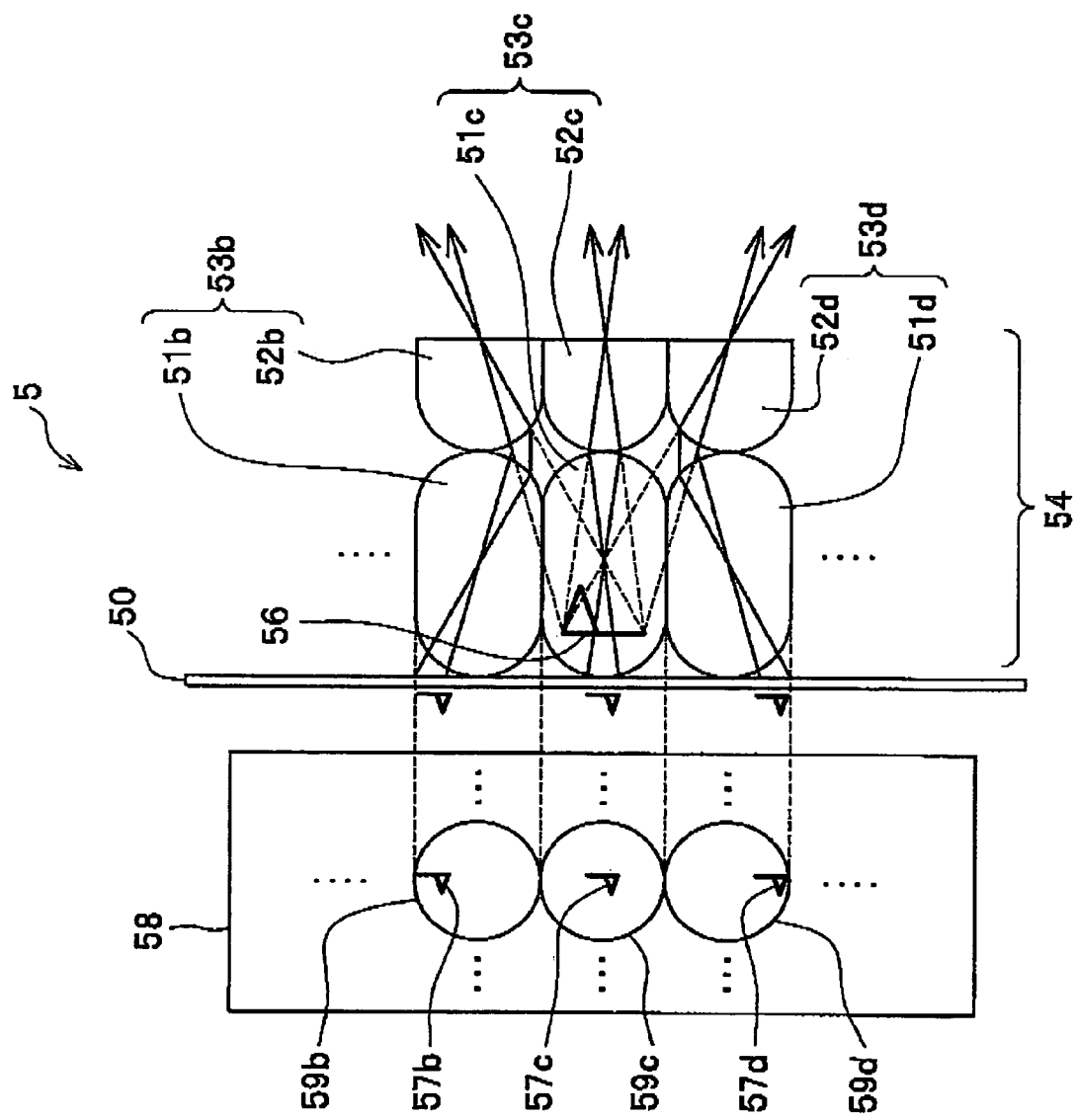
FIG. 17 is a schematic view depicting a configuration of a display device according to the present invention.

With reference to FIG. 17, a detailed description will be given below, of a display device 5 according to an embodiment of the present invention.

Figure 20A:
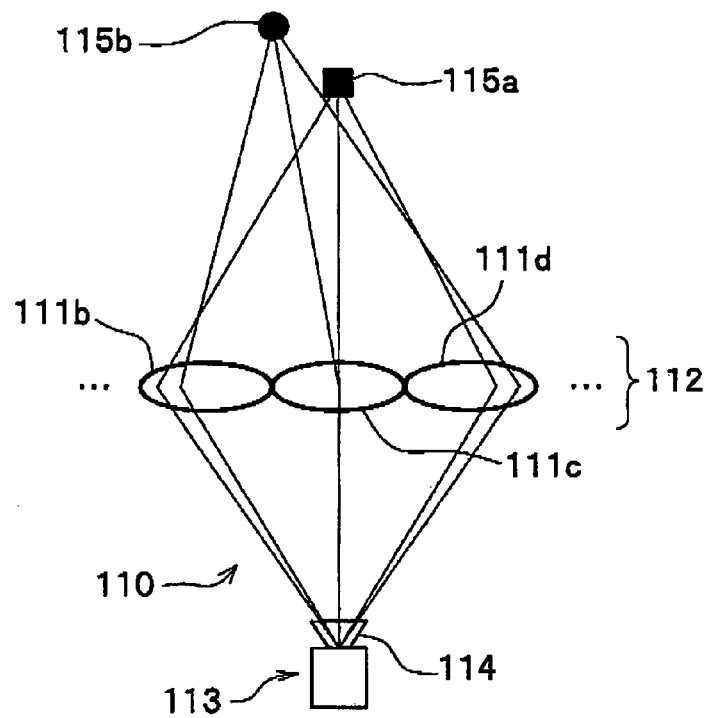
FIG. 20A is a schematic view depicting a typical imaging device according to the IP technique.

Referring to FIG. 17, a display device 5 has a function of creating a non-inverted 3D image 56 from an inverted image 58 where one or more inverted objects are shown. Note that this inverted image 58 is captured by a typical imaging device according to the IP technique such as the imaging device 110 of FIG. 20A. The display device 5 includes a display 50 and a lens component group 54.

The display (the image displaying mechanism) 50 is adapted for the inverted image 58 having been picked up by a typical imaging device according to the IP technique. This display 50 may be implemented by a general display mechanism such as a liquid crystal display.

The lens component group 54 is constituted of an array of multiple lens component systems 53b, 53c, 53d, etc. arranged in one plane perpendicular to their optical axes. These lens component systems receive light from the inverted image 58 on the display 50 and, then create the 3D image 56. The inverted image 58 is an image having been picked up by a conventional imaging device, and it contains multiple image entities 59b, 59c, 59d, etc., as shown in FIG. 17. The lens component systems 53b, 53c, 53d, etc. are arranged corresponding to the image entities 59b, 59c, 59d, etc., and receive light rays from these individual images. The lens component systems 53b, 53c, 53d, etc. are composed of the afocal optical system 51b, 51c, 51d, etc. and the image-forming optical system 52b, 52c, 52d, etc., respectively.

When collimated beams are incident to the afocal optical system 51b, 51c, 51d, etc., these systems output collimated beams. Also, these afocal optical systems invert the beams entered through the display 50 with respect to the optical axes. The afocal optical systems are arranged in one plane perpendicular to their optical axes. Each afocal optical system may be at least one optical element with uniform internal refractive index. Concretely, it may be a symmetric-convex lens such as the afocal optical system 11b (see FIG. 1) or a combination of cylindrical lenses such as the cylindrical lenses 21b, 22b, 23b and 24b (see FIG. 10). Furthermore, the afocal optical systems may be integrated in an array form.

The image-forming optical systems 52b, 52c, 52d, etc. receive the light rays having passed through the afocal optical system 51b, 51c, 51d, etc. and, then converge the light rays, respectively. These image-forming optical systems are arranged in an array form and on one plane perpendicular to their optical axes. Furthermore, the optical axes of the image-forming optical systems are the same as those of the corresponding afocal optical systems. Each of these image-forming optical systems is made of at least one optical element with uniform internal refractive index. Examples of the image-forming optical system include a plano-convex lens such as the image-forming system 12b (see FIG. 1) and a combination of cylindrical lenses such as the cylindrical lenses 25 and 26 (see FIG. 10). Furthermore, the afocal optical systems may be integrated in an array form.

Light rays from inverted objects 57b, 57c, 57d, etc. are inverted by the afocal optical systems 51b, 51c, 51d, etc., and they are then outputted therefrom, respectively. Hence, the light rays reflecting the non-inverted objects are incident to the image-forming optical systems 52b, 52c, 52d, etc., so that the 3D image 56 where the positionally correct object are shown is presented.

In the display device 5, the display 50 may be placed depending on the location of a 3D object to be focused. Especially when an object at infinity is displayed, the display 50 needs to be placed far away from the edges of the lens component systems by a distance S3 expressed by the following equation (17):

$$S3 = -3 \cdot r1/(n2-n1) \tag{17}$$

where r1 stands for a curvature radius of an asymmetric-convex lens and plano-convex lens (the afocal optical system and the image-forming optical system), n1 stands for the refractive index of the surroundings, and n2 stands for the refractive index of each lens.

Note that the above description has been given under the condition that the afocal optical system and image-forming optical system have the same curvature radius, and have the same internal refractive index. As described above, in this embodiment, all the curvature radii of curved surfaces of each afocal optical system and each image-forming optical system are equal (r1=-r2=r3), and the respective internal refractive indexes of each afocal optical system and each image-forming optical system are also equal (n2). However, note that the present invention is not limited thereto.

With this display device 5, the 3D image 56 where the positionally correct object is shown can be presented by inverting the inverted objects on the display 50. This eliminates the need for a computing process for inverting the non-inverted image 58 as well as a large-scaled electric circuit for performing the process. Moreover, each lens component system can be implemented by less expensive symmetric-convex lenses, plano-convex lenses, cylindrical lenses or a combination thereof. Accordingly, the display device 5 has the simple configuration and can be assembled at low costs, compared to a conventional device equipped with prisms or optical fibers.

[Function of Display Device]

With reference to FIG. 17, a detailed description will be given below, of a function for presenting the 3D image 56 of an object by using the display device 5.

Once the inverted image 58 is shown on the display 50 of the display device 5, light rays reflecting the inverted image 58 are incident to the afocal optical systems 51b, 51c, 51d, etc. These incident light rays are inverted by the afocal optical systems with respect to their optical axes, and the light rays are then outputted therefrom.

Subsequently, the outputted light rays enter the image-forming optical systems 52b, 52c, 52d, etc. In this state, a person (viewer) see the display 50 through the image-forming optical systems 52b, 52c, 53d, etc., the image seen by the person is the 3D image 56. By fulfilling the above function, the 3D image 56 where the positionally correct object is shown appears on the display device 5. This enables a person (viewer) to see the 3D image 56.

In this embodiment, as shown in FIG. 17, the light rays from the image entities 59b, 59c, 59d, etc. are incident to the afocal optical systems 51b, 51c, 51d, etc., and then, to the image-forming optical systems 52b, 52c, 52d, etc., respectively. However, the present invention is not limited thereto. Alternatively, on the principle of reversibility of light, the light rays from the image entities 59b, 59c, 59d, etc. may be first incident to the image-forming optical systems 52'b, 52'c, 52'd, etc., and then, to the afocal optical systems 51'b, 51'c, 51'd, etc., respectively, as in the display device 5' shown in FIG. 18.

Figure 18:
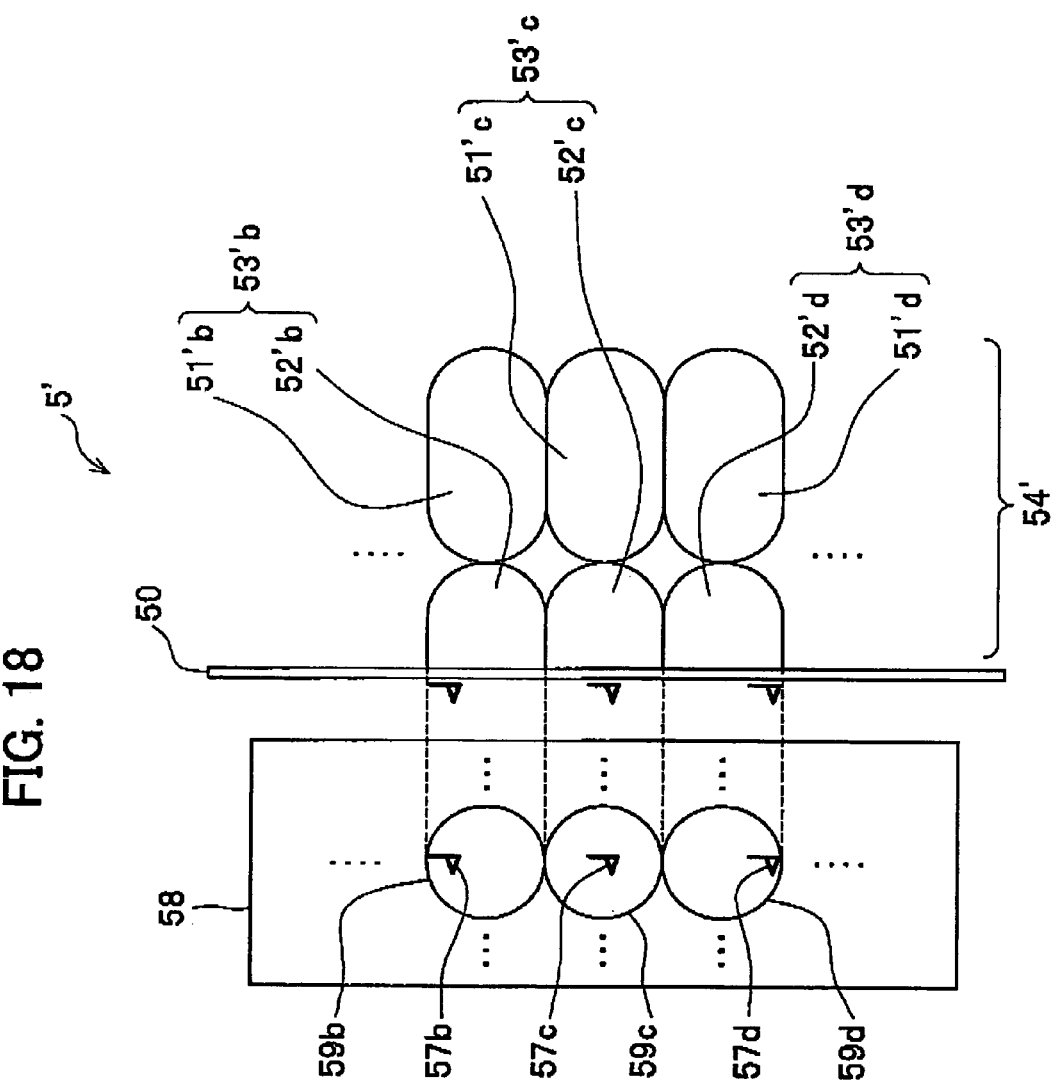
FIG. 18 is a schematic view depicting an alternative configuration of the display device.

In the display device 5' of FIG. 18, the display 50 may be placed depending on the position of a 3D image to be focused. Especially when an object at infinity is displayed, the display 50 needs to be placed in contact with the edge of the lens component system 53'b, 53'c and 53'd.

Figure 19:
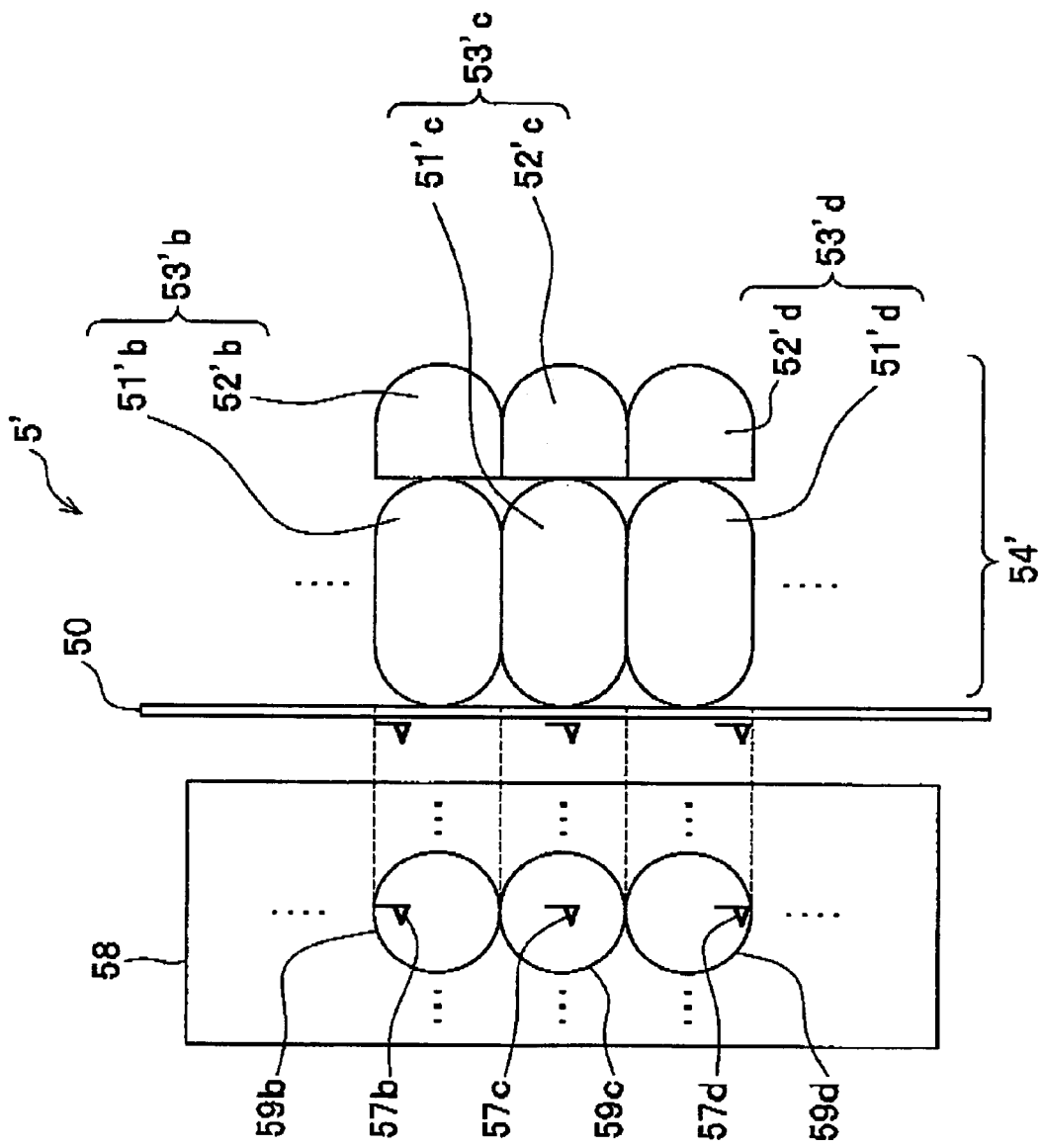
FIG. 19 is a schematic view depicting an alternative configuration of the display device.

Moreover, as shown in FIG. 19, the flat surfaces of the plano-convex lenses may be placed in contact with the edges of the afocal optical systems. In the display device 5' of FIG. 19, the display 50 may be placed depending on the position of a 3D image to be focused. Especially when an object at infinity is displayed, the display 50 needs to be placed far away from the edges of the lens component systems by a distance S4' expressed by the following equation (18).

$$S4' = -2 \cdot r1/(n2-n1) \tag{18}$$

where r1 stands for a curvature radius of an asymmetric-convex lens and plano-convex lens (the afocal optical system and the image-forming optical system), n1 stands for the refractive index of the surroundings, and n2 stands for the refractive index of each lens.

Moreover, the lens component systems of the display devices 5 and 5' each include the optical elements with uniform internal refractive index. However, the present invention is not limited thereto. Alternatively, these optical elements may be replaced by optical elements in which refractive index is changed in the radial and optical axis directions. These graded-index optical elements have the same function as that of the optical element 41, 42 or 43 shown in FIGS. 14 and 16.

Figure 20B:
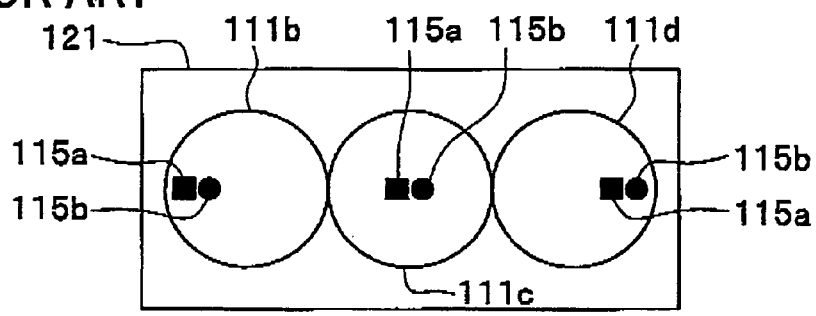
FIG. 20B is a schematic view depicting a schematic image captured by the imaging device.
Figure 21:
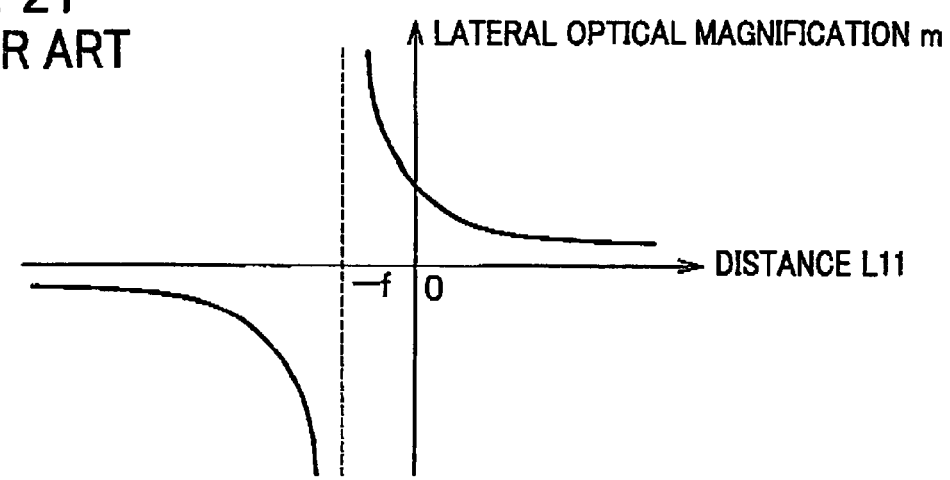
FIG. 21 is a graph showing the characteristics of the lateral optical magnification of images focused by the convex lenses of the imaging device.
Figure 22:
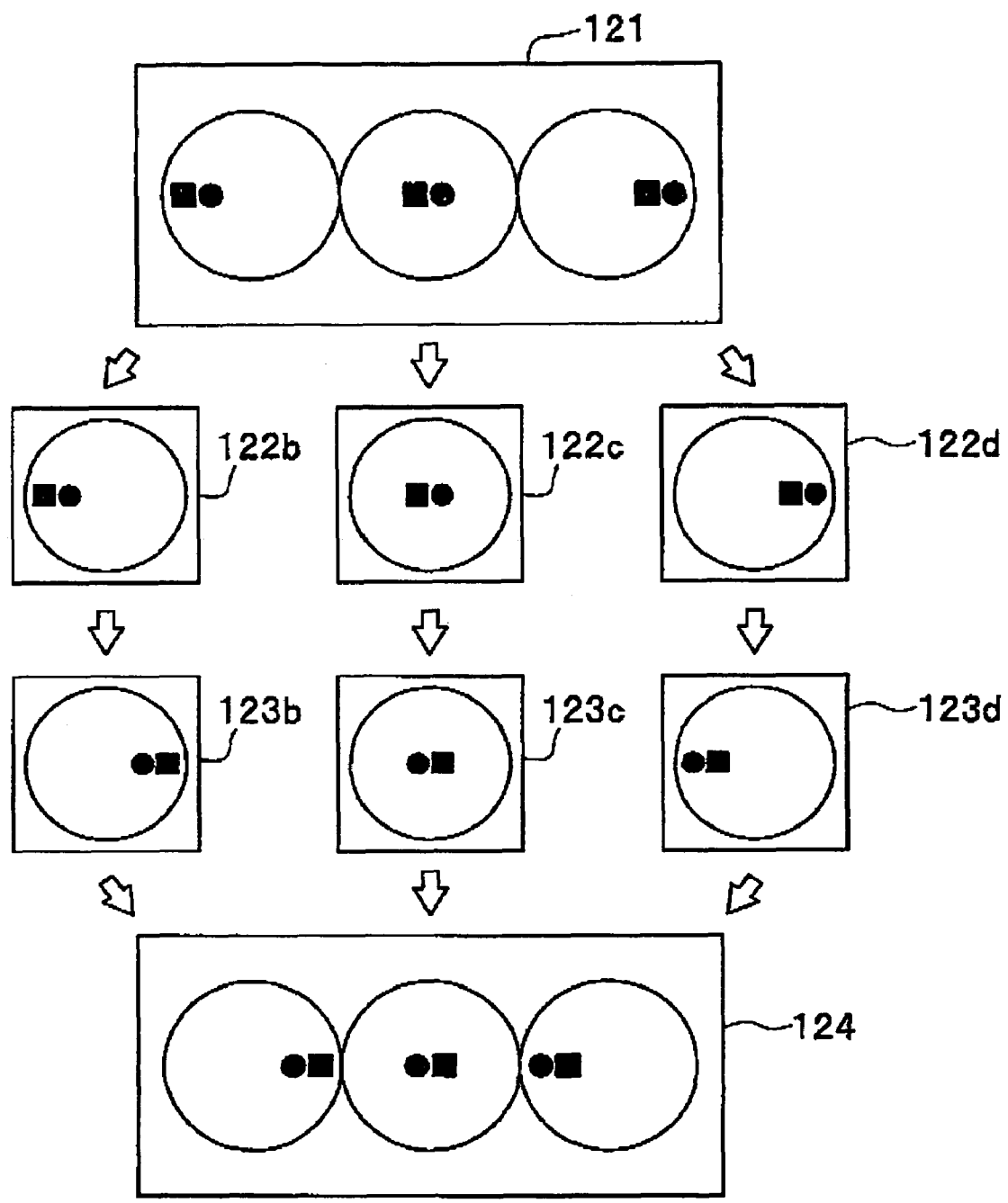
FIG. 22 is a schematic view depicting a conversion manner of an image captured with the IP technique.

In this embodiment, the image to be shown in the display 50 of the display device 5 or 5' is assumed to an image with inverted objects, which has been captured by a conventional imaging device as shown in FIG. 20. However, this invention is not limited thereto.

Alternatively, in the imaging device 110 of FIG. 20, objects may be placed at a location that is far away from the convex lenses by less than their focal length, so that an image with the non-inverted objects is created. Even if this image is inputted to the display device 5 or 5', a positionally correct 3D image can be presented.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. An imaging device for picking up an image of at least one object, comprising:
    a lens component group including a plurality of lens component systems, each of which focuses incident light from the object, thereby creating a non-inverted image of the object, the lens component systems being arranged in an array form and in one plane perpendicular to their optical axes; and
    an image capturing mechanism for picking up the image created by the lens component systems;
    each of the lens component systems including an afocal optical system for allowing the light from the object to pass through, and an image-forming system for focusing the light from the afocal optical system;
    the afocal optical system including at least one optical element for inverting an externally incident light ray with respect to its optical axis and outputting the inverted light ray, the optical element having uniform refractive index throughout its interior;
    the image-forming system including at least one optical element having uniform refractive index throughout its interior.

2. The imaging device according to claim 1, wherein the afocal optical systems are integrated in an array form.

3. The imaging device according to claim 1, wherein the image-forming systems are integrated in an array form.

4. The imaging device according to claim 1,
    wherein at least one of the afocal optical system and the image-forming system comprises a plurality of cylindrical lenses being aligned on its optical axis, each of which has one curved surface, and the cylindrical lenses make pairs, the respective curved surfaces of each of which are inclined at 90 degrees with respect to each other.

5. The imaging device according to claim 4, wherein the cylindrical lenses are integrated in one plane perpendicular to their optical axes.

6. An imaging device for picking up an image of at least one object, comprising:
    a lens component group including a plurality of lens component systems, each of which focuses incident light from the object, thereby creating a non-inverted image of the object, the lens component systems being arranged in an array form and in one plane perpendicular to their optical axes; and
    an image capturing mechanism for picking up the image created by the lens component systems;
    each of the lens component systems including an image-forming system for focusing an externally incident light ray, and an afocal optical system for inverting the light ray from the image-forming system with respect to its optical axis and outputting the inverted light ray;
    each of the image-forming system and the afocal optical system including at least one optical element having uniform refractive index throughout its interior.

7. The imaging device according to claim 6, wherein the afocal optical systems are integrated in an array form.

8. The imaging device according to claim 6, wherein the image-forming systems are integrated in an array form.

9. The imaging device according to claim 6,
    wherein at least one of the afocal optical system and the image-forming system comprises a plurality of cylindrical lenses being aligned on its optical axis, each of which has one curved surface, and the cylindrical lenses make pairs; the respective curved surfaces of each of which are inclined at 90 degrees with respect to each other.

10. The imaging device according to claim 9, wherein the cylindrical lenses arc integrated in one plane perpendicular to their optical axes.

11. An imaging device for picking up an image of at least one object, comprising:
    a lens component group including a plurality of lens component systems, each of which focuses incident light from the object, thereby creating a non-inverted image of the object, the lens component systems being arranged in an array form and in one plane perpendicular to their optical axes; and
    an image capturing mechanism for picking up the image created by the lens component systems;
    each of the lens component systems including an afocal optical system for allowing the light from die object to pass through, and an image-forming system for focusing the light from the afocal optical system;
    the afocal optical system for inverting an externally incident light ray with respect to its optical axis and outputting die inverted light ray;
    each of the afocal optical system and the image-forming system including at least one optical element in which refractive index is changed in its radial and optical axis directions.

12. An imaging device for picking up an image of at least one object, comprising:
    a lens component group including a plurality of lens component systems, each of which focuses incident light from the object, thereby creating a non-inverted image of the object, the lens component systems being arranged in an array form and in one plane perpendicular to their optical axes; and
    an image capturing mechanism for picking up the image created by the lens component systems;
    each of the lens component systems including an im-age-forming system for focusing an externally incident light ray, and an afocal optical system for inverting the light ray from the image-forming system with respect to its optical axis and outputting the inverted light ray;
    each of the afocal optical system and the image-forming system including at least one optical element in which refractive index is changed in its radial and optical axis directions.

13. A display device to which an inverted image of at least one object is inputted, the image having been created by focusing light from the object using a plurality of focusing mechanism being arranged in an array form and on the some level and been then captured, the display device for presenting the inputted image in three dimensions, comprising:
    an image display mechanism on which the inverted image appears; and
    a lens component group including a plurality of lens component systems, each of which receives light reflecting the inverted image, the lens component systems being arranged in an array form and in one plane perpendicular to their optical axes;

each of the lens component systems comprising an afocal optical system for allowing the light to pass through, and an image-forming system for focusing rho light from the afocal optical system;

the afocal optical system including at least one optical clement for inverting an externally incident light ray with respect to its optical axis and outputting the inverted light ray, the optical element having uniform refractive index throughout its interior;

the image-forming system including at least one optical element having uniform refractive index throughout its interior.

14. The display device according to claim 13, wherein at least one of the afocal optical system and the image-forming system comprises a plurality of cylindrical lenses being aligned on its optical axis, each of which has one curved surface, and the cylindrical lenses make pairs, the respective curved surfaces of each of which are inclined at 90 degrees with respect to each other.

15. The display device according to claim 14, wherein the cylindrical lenses are integrated in one plane perpendicular to their optical axes.

16. A display device to which an inverted image of at least one object is inputted, the image having been created by focusing light from the object using a plurality of focusing mechanism being arranged in an array form and on the same level and been then captured, the display device for presenting the inputted image in three dimensions, comprising:

an image display mechanism on which the inverted image appears; and a lens component group including a plurality of lens component systems, each of which receives light reflecting the inverted image, the lens component systems being arranged in an array form and in one plane perpendicular to their optical axes;

each of the lens component systems comprising an image-forming system for focusing an externally incident light ray, and an afocal optical system for inverting the light ray from the image-forming system with respect to its optical axis and outputting the inverted light ray;

each of the image-forming system and the afocal optical system including at least one optical element having uniform refractive index throughout its interior.

17. The display device according to claim 16, wherein at least one of the afocal optical system and the image-forming system comprises a plurality of cylindrical lenses being aligned on its optical axis, each of which has one curved surface, and the cylindrical lenses make pairs, the respective curved surfaces of each of which are inclined at 90 degrees with respect to each other.

18. The display device according to claim 17, wherein the cylindrical lenses are integrated in one plane perpendicular to their optical axes.

19. A display device to which an inverted image of at least one object is inputted, the image having been created by focusing light from the object using a plurality of focusing mechanism being arranged in an array form and on the same level and been then captured, the display device for presenting the inputted image in three dimensions, comprising:

an image display mechanism on which the inverted image appears; and a lens component group including a plurality of ions component systems, each of which receives light reflecting the inverted image, the lens component systems being arranged in an array form and in one plane perpendicular to their optical axes;

each of the lens component systems comprising an afocal optical system for allowing the light to pass through, and an image-forming system for focusing the light from the afocal optical system;

the afocal optical system for inverting an externally incident light ray with respect to its optical axis, and outputting the inverted light ray;

each of the afocal optical system and the image-forming system including at least one optical element in which refractive index is changed in its radial and optical axis directions.

20. A display device to which an inverted image of at least one object is inputted, the image having been created by focusing light from the object using a plurality of focusing mechanism being arranged in an array form and on the same level and been then captured, the display device for presenting the inputted image in three dimensions, comprising:

an image display mechanism on which the inverted image appears; and a lens component group including a plurality of lens component systems, each of which receives light reflecting the inverted image, the lens component systems being arranged in an array form and in one plane perpendicular to their optical axes;

each of the lens component systems comprising an image-forming system for focusing an externally incident light ray, and an afocal optical system for inverting the light ray from the image-forming system with respect to its optical axis and outputting the inverted light ray;

each of the afocal optical system and the image-forming system including at least one optical element in which refractive index is changed in its radial and optical axis directions.

* * * * *